US012732236B1

(12) United States Patent
Anderson et al.

(10) Patent No.: US 12,732,236 B1
(45) Date of Patent: Sep. 8, 2026

(54) LARGE PHASED ARRAYS USING BALANCE-IMPEDANCE PHASE SHIFTERS

(71) Applicant: Oso Semiconductor Inc., San Bruno, CA (US)

(72) Inventors: Matthew Anderson, San Bruno, CA (US); Greg LaCaille, San Bruno, CA (US)

(73) Assignee: Oso Semiconductor Inc., San Bruno, CA (US)

( * ) Notice: Subject to any disclaimer, the term of this patent is extended or adjusted under 35 U.S.C. 154(b) by 136 days.

(21) Appl. No.: 18/590,916

(22) Filed: Feb. 28, 2024

Related U.S. Application Data

(60) Provisional application No. 63/449,989, filed on Mar. 4, 2023, provisional application No. 63/449,995, filed on Mar. 4, 2023.

(51) Int. Cl.

| | |
|---|---|
| ***H04B 7/0408*** | (2017.01) |
| ***H04B 7/0426*** | (2017.01) |
| ***H04B 7/06*** | (2006.01) |

(52) U.S. Cl.
CPC ........... *H04B 7/0408* (2013.01); *H04B 7/043* (2013.01); *H04B 7/0617* (2013.01)

(58) Field of Classification Search
CPC .... H04B 7/04; H04B 7/04026; H04B 7/0408; H04B 7/043; H04B 7/0617; H04B 7/0682; H04B 7/06952; H04B 7/086; H04B 7/088
USPC ........ 375/260, 262, 265, 267; 370/329, 334, 370/341
See application file for complete search history.

(56) References Cited

U.S. PATENT DOCUMENTS

| | | | | |
|---|---|---|---|---|
| 6,411,256 | B1 * | 6/2002 | Lier | H01Q 3/26 343/DIG. 2 |
| 6,611,230 | B2 | 8/2003 | Phelan | |
| 6,703,976 | B2 * | 3/2004 | Jacomb-Hood | H01Q 1/288 342/373 |
| 10,777,890 | B2 | 9/2020 | Hallivuori | |
| 12,040,557 | B1 * | 7/2024 | Sharma | H01Q 3/38 |
| 2002/0057219 | A1 * | 5/2002 | Obayashi | H01Q 3/2605 342/372 |
| 2013/0113658 | A1 * | 5/2013 | Adams | H01Q 3/26 342/373 |
| 2015/0070242 | A1 | 3/2015 | Kawai | |
| 2017/0012764 | A1 | 1/2017 | Khlat | |

(Continued)

*Primary Examiner* — Young T. Tse
(74) *Attorney, Agent, or Firm* — J. H. Lin Patent Law P.C.

(57) ABSTRACT

A balanced-impedance phase shifter (BIPS) beamformer design that can be scaled to realize large phased arrays (e.g., arrays with element counts greater than four) while minimizing power consumption and cost is provided. The beamformer design includes multiple beamforming ports, a summation port, a first set of two or more of BIPS beamforming circuits receiving port signals from the beamforming ports to generate multiple intermediate signals, and a second set of one or more beamforming circuit receiving the multiple intermediate signals to generate a combined signal at the summation port. The second set of beamforming circuits may include a BIPS beamforming circuit. The second set of beamforming circuits may include or multiple radio frequency (RF) beamforming circuits. The first and second sets of beamforming circuits are configured to perform phase shifting based on a desired beamforming characteristics and array geometry.

18 Claims, 22 Drawing Sheets

(56) References Cited

U.S. PATENT DOCUMENTS

2018/0151953 A1 5/2018 Yoshida
2023/0033070 A1* 2/2023 Vigano ................ H01Q 3/2605

* cited by examiner

LARGE PHASED ARRAYS USING BALANCE-IMPEDANCE PHASE SHIFTERS

BACKGROUND

Technical Field

The present disclosure generally relates to radio-frequency (RF) beamforming technology.

Description of the Related Arts

Beamforming or spatial filtering is a signal processing technique used in sensor arrays and wireless communication for directional signal transmission or reception. This is achieved by combining elements in an antenna array in such a way that signals at specific angles experience constructive interference while others experience destructive interference. Beamforming can be used at both the transmitting and receiving ends in order to achieve spatial selectivity. The improvement compared with omnidirectional reception or transmission is known as the directivity of the array. Beamforming has numerous applications, including fifth generation (5G) broadband cellular networks.

SUMMARY

Some embodiments provide a balanced-impedance phase shifter (BIPS) beamformer design that can be scaled to realize large phased arrays (e.g., arrays with element counts greater than four) while minimizing power consumption and cost is provided. The beamformer design includes multiple beamforming ports, a summation port, a first set of two or more of BIPS beamforming circuits connected to the multiple beamforming ports, a second set of one or more beamforming circuits interconnecting the first set of BIPS beamforming circuits and the summation port. For receive, the first set of BIPS beamforming circuits receive port signals from the multiple beamforming ports to generate multiple intermediate signals and the second set of one or more beamforming circuits receives the multiple intermediate signals to generate a combined signal at the summation port. For transmit, the second set of one or more beamforming circuits receive a source signal from the summation port to generate multiple intermediate signals and the first set of BIPS beamforming circuits receives the multiple intermediate signals to generate port signals at the multiple beamforming ports. The first and second sets of beamforming circuits are configured to perform phase shifting based on a desired beamforming characteristics and array geometry. The phase shifters in the first set of beamforming circuits are configured to perform a first stage of phase shifting and phase shifters in the second set of beamforming circuits are configured to perform a second stage of phase shifting.

In some embodiments, the second set of beamforming circuits includes a BIPS beamforming circuit. In some embodiments, each BIPS beamforming circuit includes phase shifters that are connected in series, and each phase shifter includes a programmable admittance for controlling phase shifting. In some embodiments, each BIPS beamforming circuit includes phase shifters that are connected in shunt, and each phase shifter includes a programmable impedance controlling phase shifting.

In some embodiments, the second set of beamforming circuits does not include a BIPS beamforming circuit but instead include multiple radio frequency (RF) beamforming circuits, each RF beamforming circuit receiving an intermediate signal from a corresponding BIPS beamforming circuit to generate an amplified and phase shifted signal. Each RF beamforming circuit may utilize phase shifters, RF amplifiers, filters, vector modulators, local oscillators (LO), and/or baseband (BB)/intermediate frequency (IF) techniques. The beamformer has a power combiner circuit for combining the amplified and phase shifted signals generated by the multiple RF beamforming circuits to generate the combined signal at the summation port.

In some embodiments, each phase shifter in the first set of BIPS beamforming circuits include a crossover switch for introducing a 180 degree phase shift. In some embodiments, the phase shifters in the second set of BIPS beamforming circuit do not have crossover switches, and the crossover switches of the first set of BIPS beamforming circuits are configured to introduce an additional 180 degree phase shift. In some embodiments, each of the second set of RF beamforming circuit has a phase shifter that is limited less than 360 degrees of phase shifting, nominally 180 degrees or less phase shifting, and the crossover switches of the first set of BIPS beamforming circuits are configured to introduce an additional 180 degree phase shift.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

I. Beamformers

Phased arrays or electrically steerable antenna (ESA) are a key enabling technology for many modern wireless networks and sensors. Example applications of phased arrays include high-performance radars for planes, cars, and drones to provide single degree spatial resolution imaging. ESAs enable highly focused transmit power for satellites and 5G base stations to increase range and energy efficiency. They allow for near instantaneous digital steering of wireless beams to track fast moving objects, like planes and trains. They may also have Internet-of-Things (IoT) applications for providing low-power spatially selective tags.

A phased array includes multiple antenna elements (sometimes thousands) arranged in regular patterns. These individual antenna elements work together to receive or transmit signals with a fixed phase relationship, creating radiation patterns with regions of constructive (or high gain) and destructive (or low gain) interference. The antenna elements in the phased array can form narrow, high-gain wireless beams. These wireless beams can be programmed electronically to track moving objects or hone-in on small signals in noisy environments. This operation of precise phase shifting and summation to form the wireless beams is referred to as beamforming. The more antenna elements that are beamformed for the array, the higher the gain and the narrower the beam, which translate to greater range and spatial selectivity.

Figure 1:
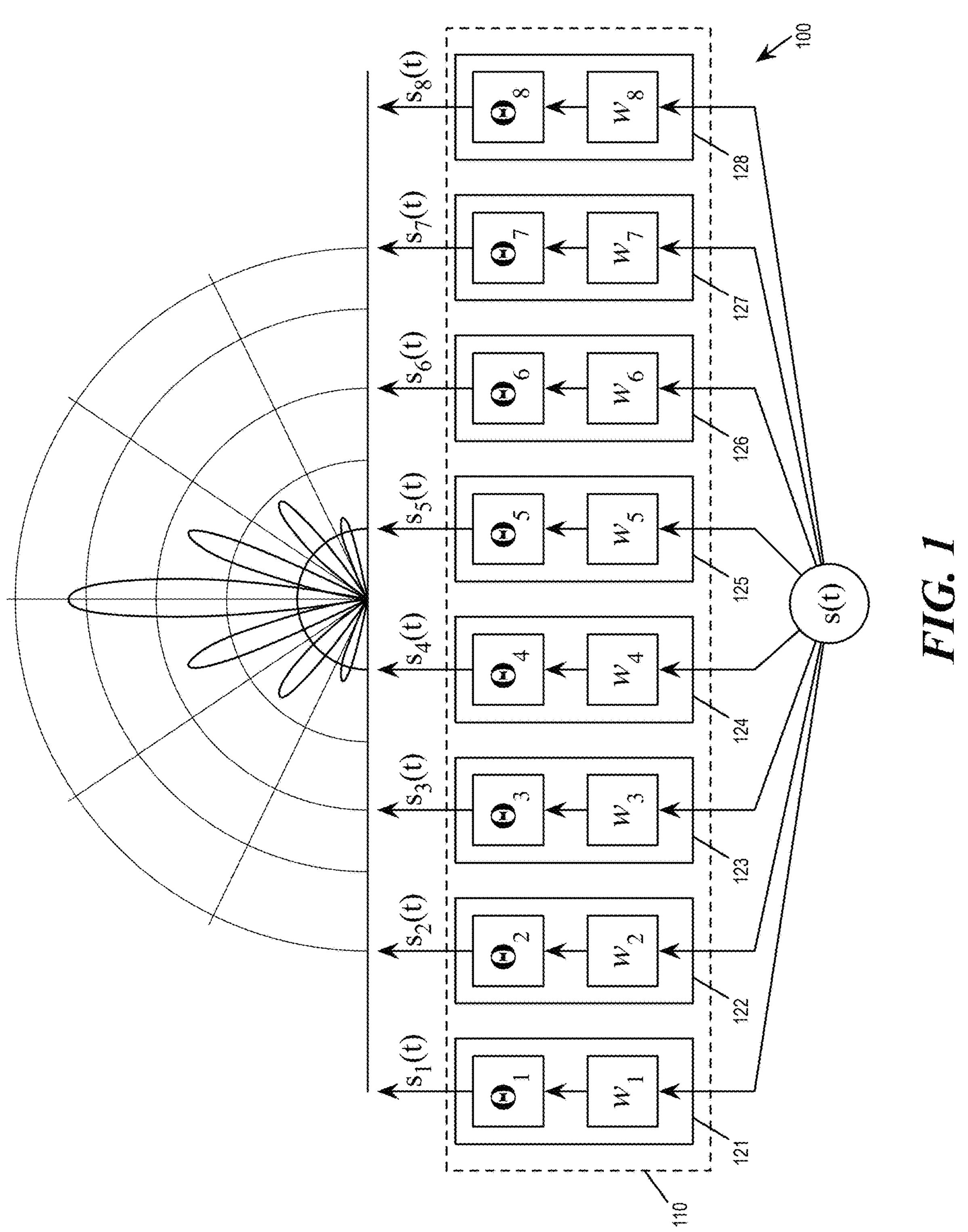
FIG. 1 conceptually illustrates an example beamformer performing beamforming operation.

FIG. 1 conceptually illustrates an example beamformer 100 performing beamforming operation. The example beamformer 100 includes an array 110 that includes multiple beamforming elements 121-128. The beamformer 110 may be part of a phased array in which each beamforming element is attached to an antenna element. Each beamforming element includes a phase controller (Θ), an optional gain controller (w). Based on a source signal s(t), the beamformer 110 generate a beam pattern by the sum of the signals from the antennas attached to the beamforming elements. The phase controllers in the array 110 control the phase delays of the signals $s_1(t)$ through $s_8(t)$ from the different beamforming elements in order to create the intended beam pattern.

Figure 2:
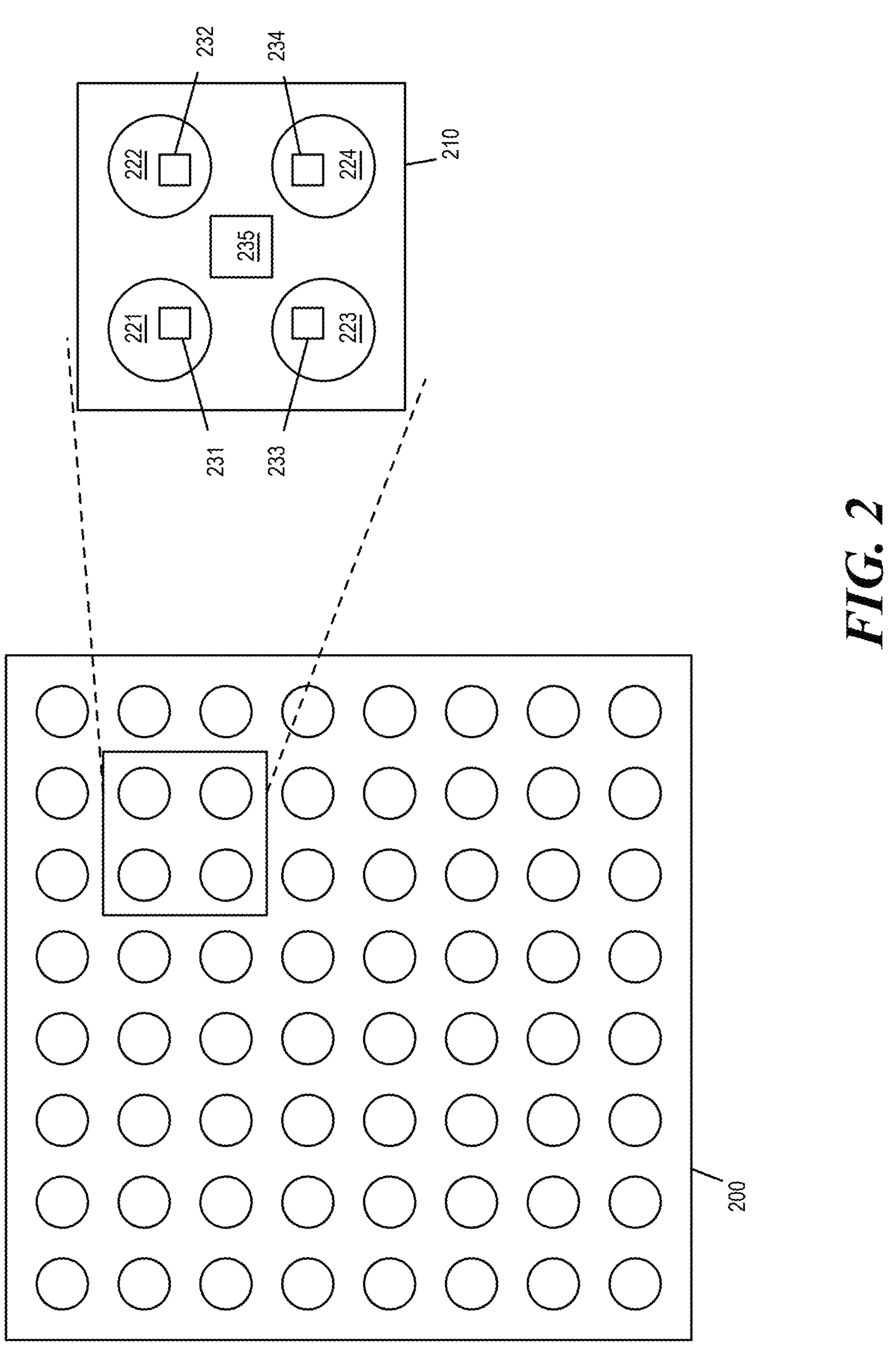
FIG. 2 illustrates an electronic device implementing a two-dimensional phased array.

FIG. 2 illustrates an electronic device 200 implementing a two-dimensional phased array. The two-dimensional phased array includes 64 antennas (or radiating elements). The two-dimension phased array is implemented by an arrangement of 2-by-2 unit cells. Each unit cell 210 is an electronic circuit (e.g., a printed circuit board) that implement four antennas 221-224. Each unit cell includes one or more RF ICs 231-235 that perform phase control, optional gain control, and signal summation required for beamforming. In other words, each unit cell implements the corresponding beamforming elements for the antenna elements.

Implementing phase arrays in modern wireless networks pose certain power challenges. These phase array systems require many antenna elements, each with their own power-hungry RF signal chains and signal processing. The result being a significant increase in RF power consumption for phased array beamforming systems over omni-directional wireless systems. The fact that these phase array systems usually operate at significantly higher frequencies, where silicon transistors are less efficient and per-antenna apertures are smaller, only makes the power problem worse. Even in modestly sized arrays, the added power consumption can be problematic for both battery-life and thermal management.

The key drivers for the high-power consumption in the beamforming systems are the electronic components used, particularly the RF frontend amplifiers such as the low-power amplifiers (LNAs), power amplifiers (PAs), variable gain amplifiers (VGAs), and beamformers. The RF amplifiers in these frontend components are quite power-intensive as these systems often include many stages of RF amplification. The RF amplification are employed to compensate for the lossy beamformers, which perform high frequency phase shifting and summation required to steer the array's beam.

Due to massively duplicated elements in phase arrays, the complexity, cost, and power consumptions of individual components are significant issues for a beamforming system. Simplifications that reduce the complexity or size of each component part, such as the beamformer, have a significant impact on reducing overall phase array complexity, cost, and power consumptions. Techniques that reduce beamformer RF losses will also have a huge impact on overall system power consumption and performance because they reduce the amount of power-hungry RF amplifiers in the system.

RF beamformers may use Wilkinson combiners for signal summation or power combining and switch-type passive phase shifters for phase shifting. Such RF beamformers may use RF amplifiers to compensate for lossy passive phase shifters and power combiners, or use active RF vector modulator-based phase shifters with built-in gain. In both cases, the active RF components consume significant amounts of power in order to generate low-noise, low-distortion gain at these high (RF) frequencies. Power consumption and cost can also scale with the number of elements, particularly for large phased arrays.

There are several different types of beamforming approaches that can be used to realize large phased arrays: (1) RF Beamforming which utilizes phase shifters and power combiners in the high-frequency RF-domain; (2) BB (baseband) Beamforming, which utilize phase shifters and summation techniques at analog baseband, between the mixers and the analog-to-digital converters; (3) LO (local oscillator) Beamforming, which uses phase shifters in the RF domain and baseband power combiners, with the phase shifters in the path of the local oscillator; (4) IF (intermediate frequency) Beamforming, which uses phase shifters and combiners at an intermediate frequency that is higher than baseband but lower than RF; and (5) Digital Beamforming, which implement phase shifters and summation in the digital-domain, relying on digital signal processing to construct the required beams. They require massive amounts of duplication in terms of the RF front end amplifiers (e.g., LNAs, PAs, VGAs) so they consume significant amounts of power and may be quite expensive.

II. Balanced Impedance Phase Shifters (BIPS)

Balanced-impedance phase shifter (BIPS) beamformers use transmission-line transformers (TLTs) incorporated into the feed lines and balanced impedance phase shifters (BIPSs) to construct an RF beamforming phased array. Utilizing TLTs built into the feed structure for series signal combining eliminates the need for additional lossy RF power combining structures, while the use of balanced impedance tuning (BIT) algorithms with BIPSs reduces the loss and complexity associated with phase shifting. Altogether this allows for the realization of a low power and low loss RF beamformer with good bandwidth.

Figure 3B:
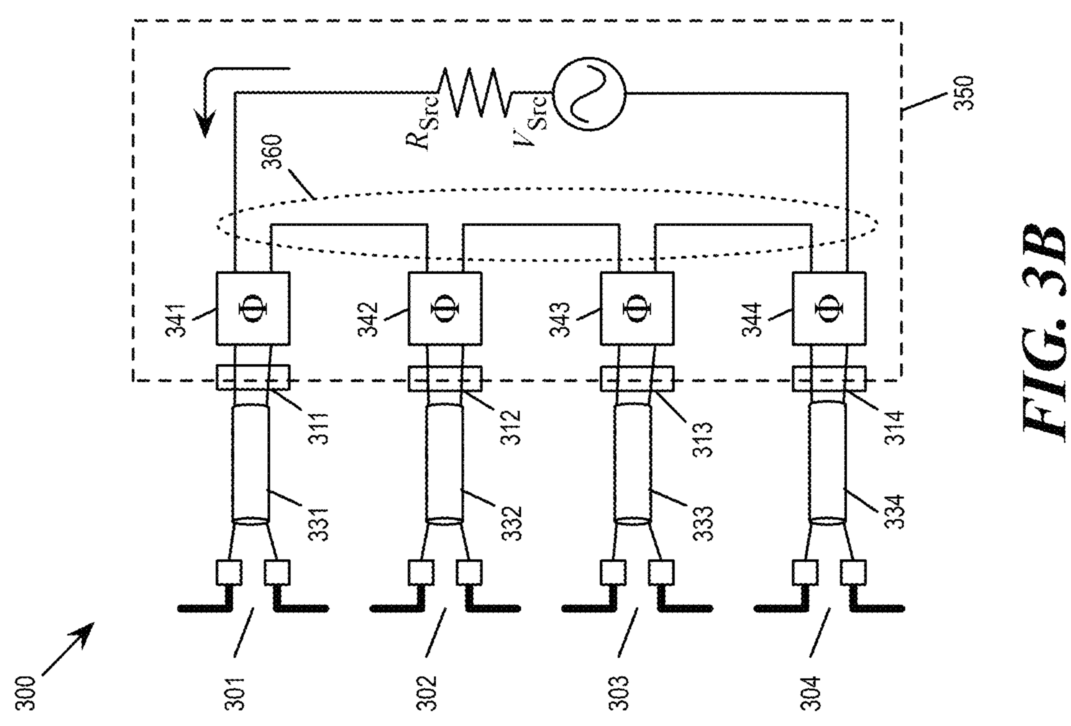
FIGS. 3A-B illustrate a series-connected balanced impedance phase shifter (BIPS) beamformer that is used to implement a phased array.
Figure 3A:
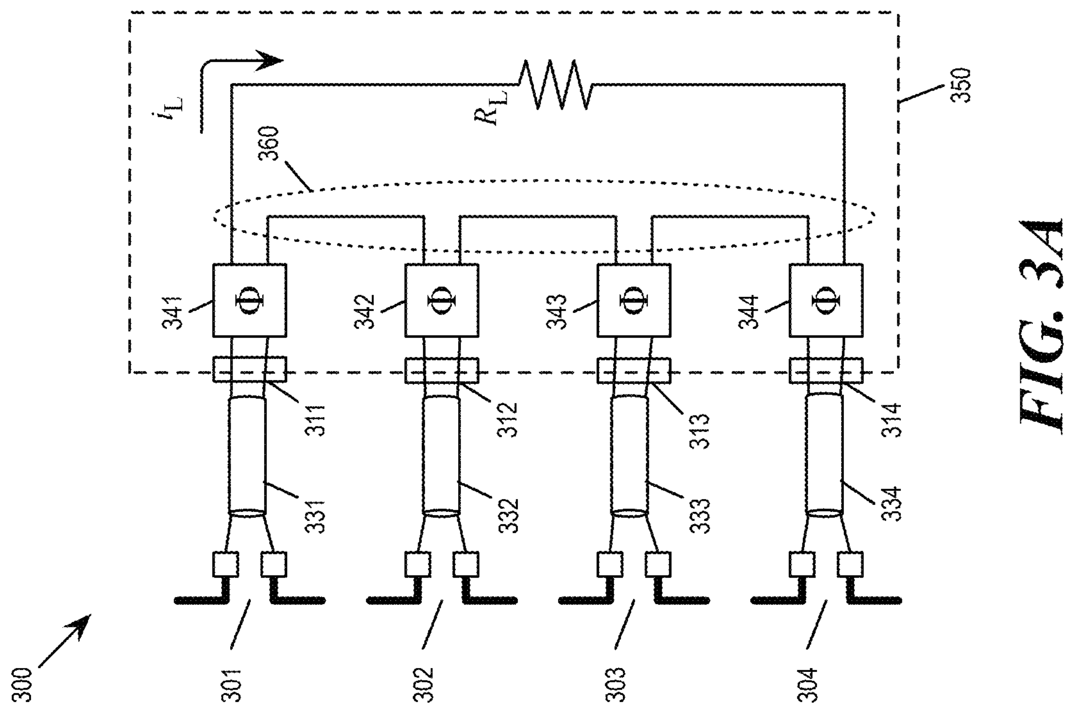

FIGS. 3A-B illustrate a series-connected BIPS beamformer 300 that is used to implement a phased array. The BIPS beamformer 300 is implemented by an RF IC 350. RF feedlines, which may be used to implement TLTs to reduce common-mode loss, 331-334 connect four antennas 301-304 to the RF IC 350 at four beamforming ports 311-314. The RF IC 350 implements four balanced impedance phase shifters (BIPS) 341-344 to phase shift the signals of the four beamforming ports 311-314. In some embodiments, the four beamforming ports 311-314, the BIPS 341-344, and the RF feedlines 331-334 may be entirely or partially implemented by the RF IC 350. FIG. 3A shows the beamformer 300 operating in a receive mode. FIG. 3B shows the beamformer 300 operating in a transmit mode.

The phase shifting elements of the beamforming ports 311-314 are connected in series in the IC 350 with a load impedance ($R_L$) or a power source ($R_{Src}+V_{Src}$). A node 360 at which the four phase shifting elements are connected in series is referred to as the summing node of the beamformer 300. The load impedance $R_L$ or source impedance $R_{Src}$ at the summing node 360 is designed to ensure optimal power transfer from the antennas to the IC 350 over all available beam angles 350. The RF feed lines 331-334 are designed to also function as transmission line transformers (TLTs), transforming the effective common-mode impedance seen at the input of the IC 350 to a large real value in order to facilitate low-loss and wide bandwidth series combining without affecting the differential-mode impedance.

For some embodiments, a high common-mode impedance is used at the summing node of the beamformer for low-loss summation via series combining. A large complex network may be used to optimize the common-mode impedance. In some embodiments, transmission-line transformers (TLTs) are used to implement the common-mode impedance at the summing node. In some embodiments a specialized matching network (MN) can be used to provide common-mode impedance conditioning to minimize the losses at the summing node. In some embodiments, both TLTs and MN may be used.

Figure 4:
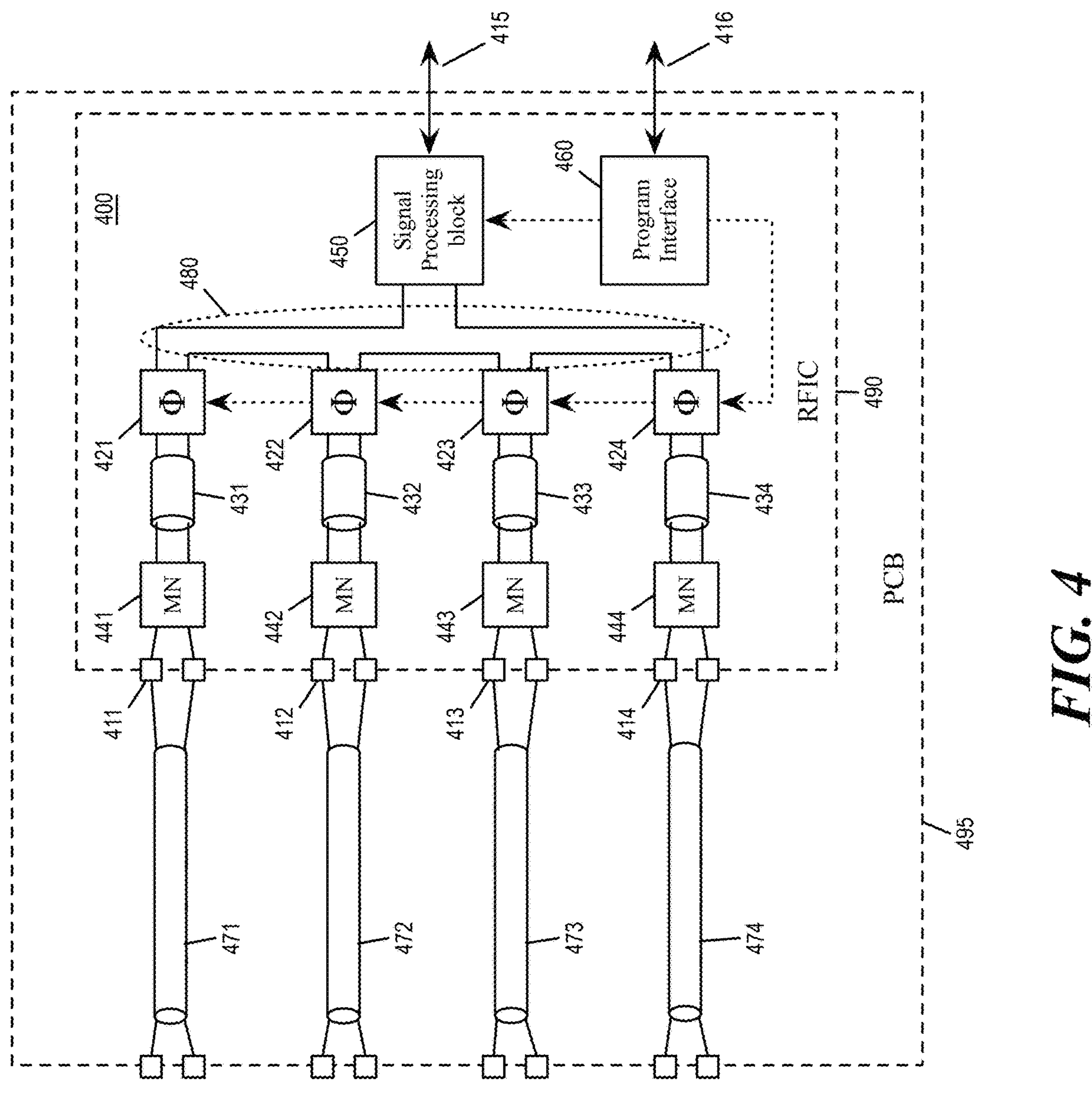
FIG. 4 shows a series-connected BIPS beamformer having optimized common-mode impedance at the summing node.

FIG. 4 conceptually illustrates a BIPS beamformer 400 having optimized common-mode impedance at the summing node by incorporating transmission-line transformers (TLTs) and matching networks (MN). The example BIPS beamformer 400 is a four-element BIPS beamformer with four beamforming ports 411-414. The four beamforming ports 411-414 may drive or receive from four antenna elements through four RF feedlines 471-474, which are used as TLTs. The beamformer 400 includes corresponding BIPSs 421-424, MNs 441-444, and TLTs 471-474. The BIPSs 421-424 are used as phase shifters or delay blocks for four beamforming elements.

In receive mode, the powers of the four beamforming elements are combined at the summing node 480 of the beamformer 400. The combined power is feed to a signal processing block 450 for amplification or filtering as needed by the array. A programming interface 460 provide control bits to the BIPS cell units/phase shifters 421-424. The signal processing block 450 may be an amplifier, transformer, mixer, digital converter, or other common circuit block. The signal processing block 450 may also be absent in some embodiments. Ports 415 and 416 serve as control/data connections to the signal processing block 450 and the programming interface 460, respectively. In transmit, the signal flow may be reversed.

In this implementation, the BIPSs 421-424 and the MNs 441-444 (with the RF routing 431-434) are placed on a RF integrated circuit (RFIC) 490. The TLTs 471-474 are designed on a printed circuit board (PCB) 495 that carries the RFIC 490. The TLTs 471-474, the BIPSs 421-424, and the MNs 431-434 all contribute to the overall loss, area, and complexity of the beamformer 400.

Figure 5:
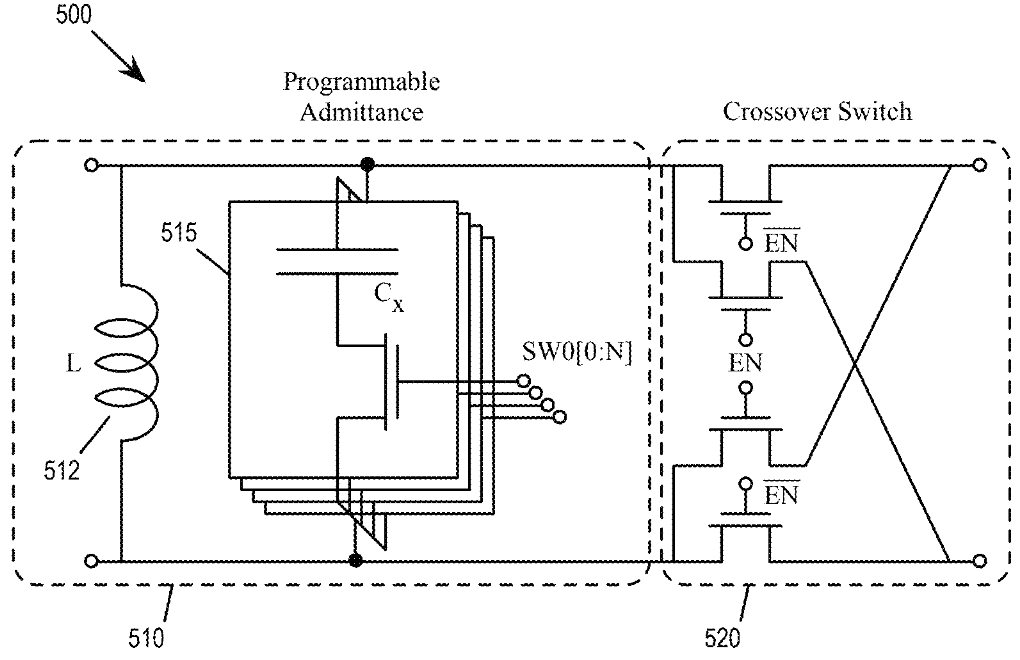
FIG. 5 conceptually illustrates an example BIPS cell unit for a series-connected BIPS beamformer.

FIG. 5 conceptually illustrates an example BIPS cell unit 500. As illustrated, the BIPS cell unit 500 (or delay block or phase shifter) has a programmable admittance 510 and a crossover switch 520. The BIPS cell unit 500 can be used as any of the BIPS cell units 341-344 or 421-424. The digitally controlled programmable admittance 510 varies from $+jk/R_s$ to $-jk/R_s$, where $R_s$ is the beamformer port impedance, k is a scaling factor set by the desired scan angle loss (nominally, $k \approx 1$), and j indicates imaginary domain. Increasing k results in lower theoretical losses across scan angle but makes practical realization of the programmable admittance more challenging and more lossy. The crossover switch 520 is also digitally controlled and can be activated or deactivated to impart a 180° or 0° phase shift on the signals passing through the BIPS.

In the BIPS, the programmable admittance 510 may be implemented using a shunt connected fixed inductor 512 and digitally tunable capacitor (DTC) 515, while the crossover switch 520 may be implemented using four transistor switches in a butterfly or crossover configuration.

A linear 1-dimensional phased arrays such as the BIPS beamformer 400 is inherently symmetrical in that the desired phase shift on port 1 (or 2) is the negative of the desired phase shift on port 4 (or 3). A BIT algorithm controlling a BIPS may take advantage of this symmetry such that the number of switchable or tunable components and the number of lossy passives in the BIPS can be significantly reduced (when compared to e.g., conventional switch-type passive phase shifters.) This ultimately reduces phase shifter loss. This approach reduces the complexity of the phase shifters because in the BIPS 400, the reactance added in shunt across one port (e.g., the admittance 510 of a BIPS unit cell 500) to impart a phase shift, Y, is canceled by the negative reactance added in shunt across another port to impart the opposite phase shift, −Y. This eliminates the need for additional lossy components in the phase shifters to maintain a relatively constant input and output impedance (e.g., 50 Ohms) across a range of phase shifts.

A balanced impedance tuning (BIT) algorithm may be utilized in conjunction with the BIPS beamformer 400 to enable low-loss phase shifting and beamforming. The algorithm leverages symmetry of the array to simplify the phase shifter circuitry required and reduce sources of loss.

For some embodiments, a high common-mode impedance is used at the summing node of the beamformer for low-loss summation via series combining. A large complex network may be used for optimizing the common-mode impedance. In some embodiments, transmission-line transformers (TLTs) are used to implement the common-mode impedance at the summing node. In some embodiments a specialized matching network (MN) can be used for common-mode impedance conditioning to minimize the losses at the summing node.

Figure 6:
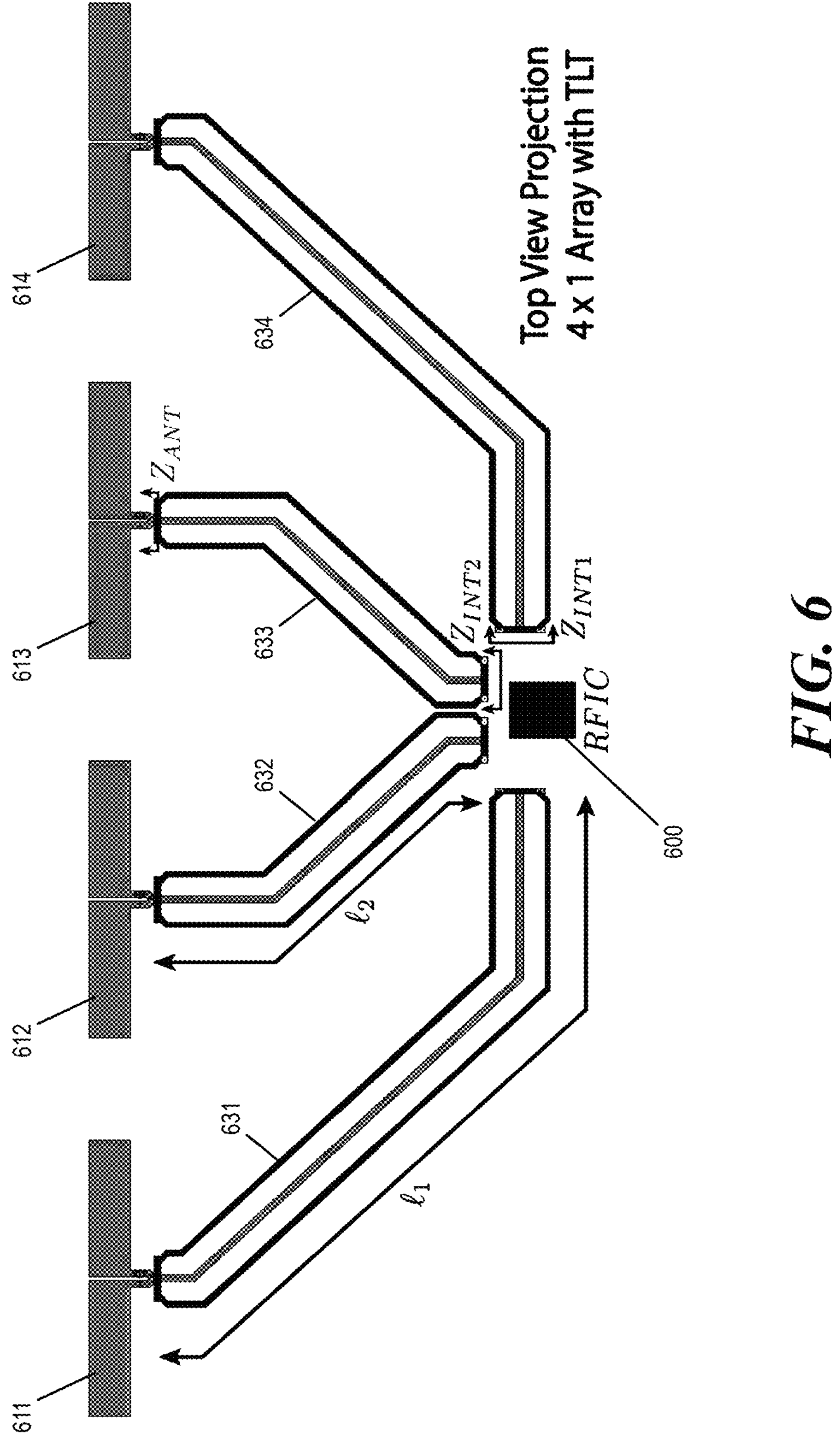
FIG. 6 illustrates routing of transmission-line transformers from an antenna array to a radio frequency integrated circuit (RFIC).

In the example of FIG. 4, the BIPS beamformer 400 includes the TLTs 431-434 and the MNs 441-444 for implementing the common-mode impedance and for providing the common-mode impedance conditioning at the summing node 480. FIG. 6 illustrates routing of transmission-line transformers (TLTs) 631-634 from an antenna array (antenna elements) 611-614 to a RFIC 600 implementing the BIPS beamformer.

The TLTs shown in FIG. 6 utilizes transmission lines with a high characteristic common-mode impedance $Z^{CM}_{O}$, and an optimized length l, to transform the port's common-mode impedance (e.g., the antenna's common-mode impedance $Z_{ANT}$) to a large real value (of common-mode impedance at the interface of the RFIC 600 $Z_{INT}$) for low-loss series combining. Broadside coupled transmission lines may be chosen because of their large characteristic common-mode impedance $Z^{CM}_{O}$. The length of the transmission lines (value of l) can be determined using electromagnetic simulation.

While the BIPS RF beamformers are low loss passive beamformers relative to state of the art, they still suffer very high RF losses. This results in either reduced performance or higher power consumption for phased arrays utilizing BIPS RF beamformers. The primary loss sources are the matching network (MN) and transmission-line transformers (TLTs) which are required to condition the common-mode impedance from the beamforming ports. The MN requires many passive components, including inductors and capacitors, all of which add loss and limit the common-mode impedance realized at the summing node. The TLTs also help to maximize the common-mode impedance at the summing node but are ultimately limited by their own characteristic common-mode impedance.

The TLTs may also have an impact on size and complexity of the beamformer system. The TLT network may add significant size and complexity to the beamformer. The large cross-sectional area of the RF feed lines in the TLTs make it difficult to route the signals from the beamforming ports to the beamformer circuit. Requirements for precise control of TLT dimensions, including trace spacing and dielectric height, introduce significant constraints on the design of printed circuit boards (PCBs) and other design mediums.

Figure 7A:
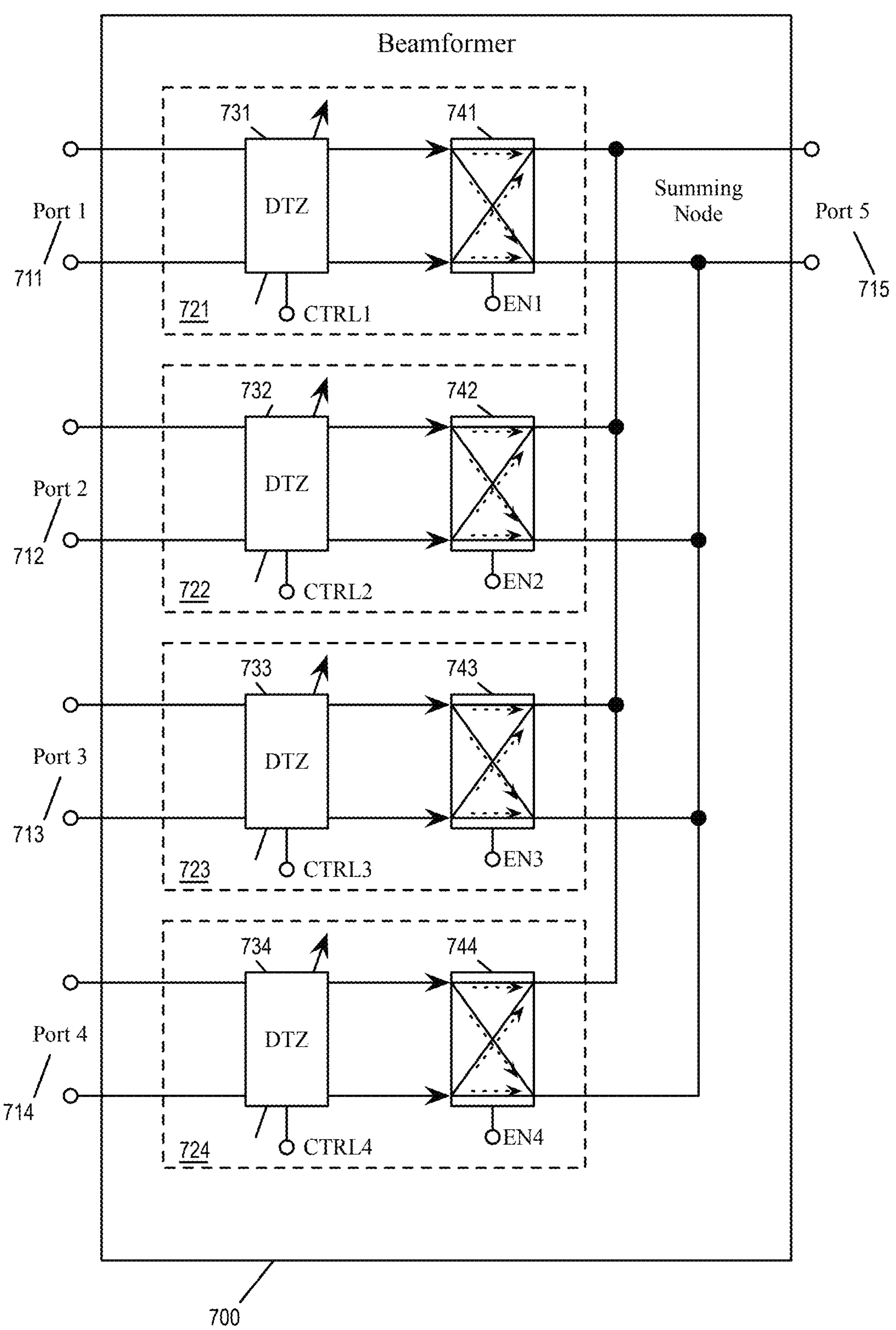
FIGS. 7A-B show an example circuit of a shunt-connected BIPS beamformer.
Figure 7B:
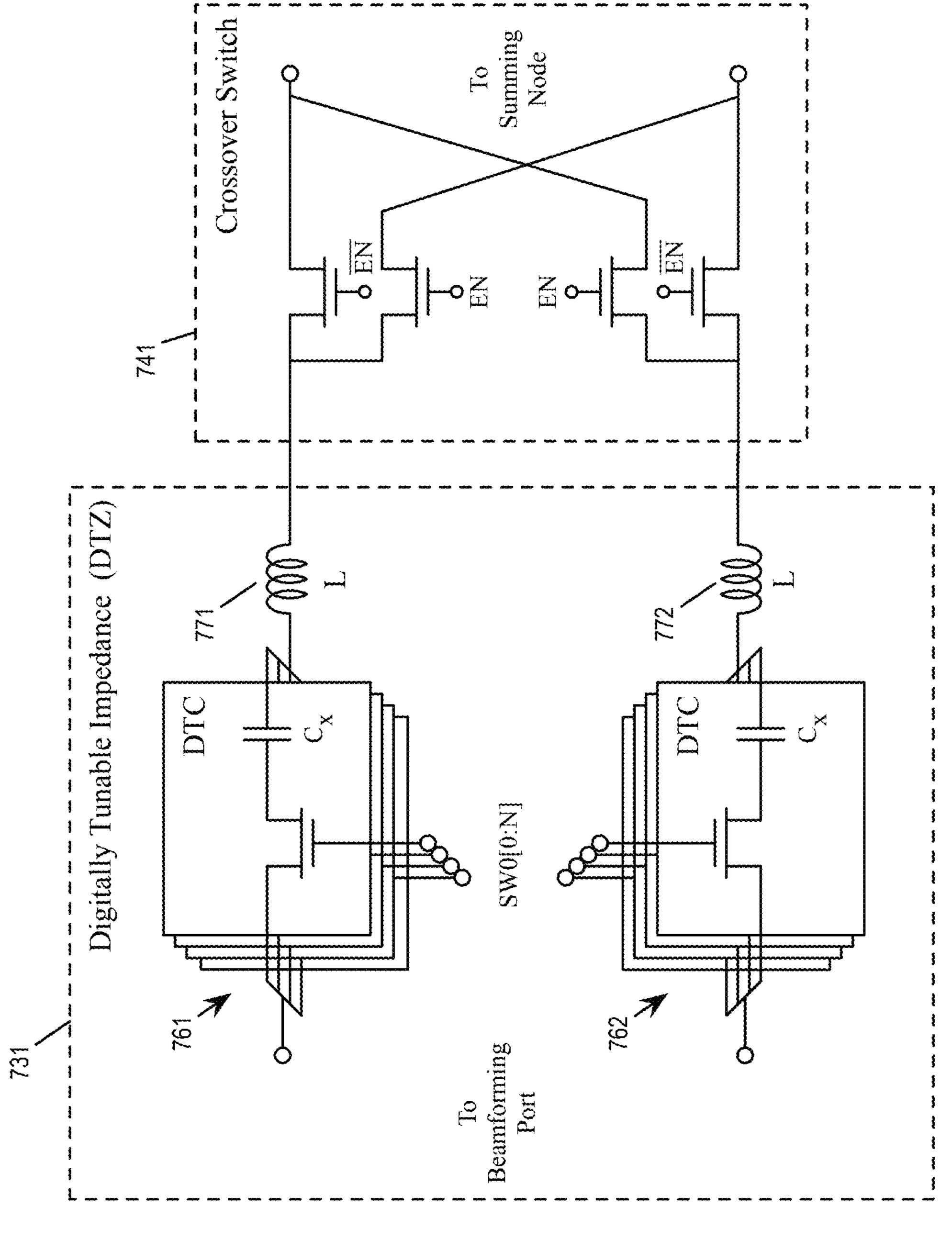

FIGS. 7A-B show an example circuit of a shunt-connected BIPS beamformer. FIG. 7A illustrates the shunt-connected BIPS beamformer circuit 700 having four balanced impedance phase shifters (BIPS) 721-724 to phase shift the signals of the four beamforming ports 711-714 (ports 1-4). The beamforming ports 711-714 may also be buffered or not. They may terminate into the antennas or some other signal processing block.

The four phase shifters (or BIPS unit cells) 721-724 are connected in shunt at summing node 750, which is accessible by a fifth port 715 (port 5) of the circuit 700. The summing node 750 of the shunt-connected BIPS beamformer is also referred to as the shunt connection point.

The phase shifter of each beamforming port includes a digitally tunable impedances (DTZ) and a crossover switch. In the example, the phase shifters 721-724 includes DTZs 731-734 and crossover switches 741-744. The DTZs 731-734 are respectively controlled by control signals CTRL1-CTRL4, while the crossover switches 741-744 are respectively enabled by enable signals EN1-EN4.

FIG. 7B illustrates one of the phase shifters, or a BIPS unit cell, in greater detail. As illustrated, the phase shifter 721 includes the DTZ 731 and the crossover switch 741. The DTZ 731 includes two complementary banks of programmable capacitors 761 and 762 for differential signaling. Each programmable capacitor may be a digital tunable capacitor (DTC). The DTCs of each bank are connected together in shunt, while each DTC is connected in series with the beamforming port and the summing node. Though not illustrated, in some embodiments, the DTZs 731-734 may also be implemented by using programmable inductors.

The two banks of DTCs 761 and 762 are controlled by a same set of switch signals SW0[0:N]. The switch signals can configure the two banks of DTCs to present a specific impedance value of the DTZ 731. Connected in series with the DTC banks 761 and 762 are fixed inductors 771 and 772, which are in turn connected to the differential inputs of the crossover switch 741. The crossover switch is in turn connected to summing node or port 5. The DTCs may be implemented using any tunable elements, including capacitive DACs, varactors, active devices, etc. The circuits may also feature balanced or unbalanced topologies.

The beamforming in the shunt-connected BIPS beamformer may be performed by a shunt-based balanced impedance tuning (BIT) algorithm, in which the impedances (instead of admittances) are tuned in a balanced way to provide relative phase shifts of 90° or less and crossover switches provide 0° and 180° phase shift. Due to the symmetry inherent in any planar array, the relative phase shifts between the beamforming ports can be set to be balanced. This balance in relative phase shift can be leveraged by the shunt-based BIT algorithm.

It can be shown that through the balanced tuning of the DTZs in the shunt-connected beamformer, a phase shift can be produced from beamforming port i (1 through 4) to port 5 (and vice-versa) that is proportional to the angle of $(R_s+Z^i_{DTZ})$ were $R_s$ is the i-th beamforming port impedance and $Z^i_{DTZ}$ is the impedance of the DTZ on the i-th beamforming port. Correspondingly, a small imaginary $Z^i_{DTZ}$ relative to $R_s$ produces a negligible phase shift, and a positive or negative imaginary $Z^i$ equaling to $R_s$ produces a nearly +45° or −45° phase shift. In this way, the phase shift can be controlled from each of the beamforming ports relative to port 5 to ensure constructive interference in the direction of interest and destructive interference in other directions (i.e., beamforming).

In the shunt-based BIT algorithm, the DTZs are sized to vary from $+jkR_s$ to $-jkR_s$, where $R_s$ is the beamformer port impedance and k is a scaling factor set by the desired scan angle loss (nominally, k≈1). Increasing k may result in lower theoretical losses across scan angle but makes practical realization of the DTZ more challenging and more lossy. Implementations of the DTZ may feature an inductor, L, and a digitally tunable capacitor (DTC). The values of L, $C_{DTC}$, $C^{max}_{DTC}$, and $C^{min}_{DTC}$ are sized such that $Z_{DTZ}$ ranges from $+jkR_s$ to $-jkR_s$ over the frequencies of interest ($C^{max}_{DTC}$ and $C^{min}_{DTC}$ are the maximum and minimum achievable capacitances for the DTC).

In some embodiments, the shunt-based BIT algorithm has the following features: First, with $Z_{DTZ}$ set to zero at all ports, the crossover switches (e.g., the switches 741-744 in the phase shifters 721-724) are configured to reduce the maximum phase delay between all ports. Second, the change in impedance across the phase shifter 721 for port 1, $\Delta Z_1$, is set to be equal to the negative of the change in impedance across the phase shifter 724 for port 4, $-\Delta Z_4$. Third, the change in impedance across the phase shifter for port 2, $\Delta Z_2$, is set to be equal to the negative of the change in impedance across the phase shifter for port 3, $-\Delta Z_3$. Fourth, the value of $\Delta Z_1$ and $\Delta Z_2$ are swept to maximize the power delivered to the load for a given angle of arrival, θ. This process may consider finite quantization increments in the programmable Z (impedance) values, relative phase delays in the ports due to differing feed lengths, limits in the absolute range of Z values, and power loss due to impedance mismatch with the load for larger absolute values of Z. The algorithm and hardware described so far also works for transmit, where power is flowing from a source to the beamforming ports with varying phase delays to maximize the power delivered for a given θ.

III. Cascaded Beamforming Circuits

BIPS beamformers can only practically scale to N=2 or 4, or at most 8 elements. (N is the number of antenna elements in the array.) This is due to issues with common-mode impedances inducing losses that increase more than linearly with N, and excessive impedance transformations which make it difficult to match them with other circuits.

Some embodiments of the disclosure provide methods and circuits for scaling BIPS beamformers to realize large phased arrays (e.g., arrays with element counts >4 or >8) that minimizes power consumption and cost. Such methods and circuits may include (i) a first set of circuits for realizing large phased arrays using tiered combinations of BIPS beamformers (described in Section III-A below); (ii) a second set of circuits for realizing large phased arrays using tiered combinations of BIPS beamformers and conventional RF beamformers (described in Section III-B below); (iii) a process (i.e. algorithm) for determining the appropriate phase shift for the BIPS beamformers and conventional beamformers based on desired beamforming characteristics and array geometry (described in Section III-C below); (iv) a further improved set of circuits and a process for realizing large phased arrays using tiered combinations of BIPS beamformers and conventional RF beamformers, in which the MSB (most significant bit) for the conventional RF phase shifters is removed and its functionality is incorporated into the BIPS beamformers crossover switch (described in Section III-D below.)

A phased array is constructed based on a collection of antennas arranged in a regular pattern or array. Electromagnetic radiation incident upon the array creates signals in each of the antennas. The phase relationship between these signals is governed by the geometry of the array and the angle of arrival of the incident radiation. The signals created by the antenna in the array can be referred to as antenna signals. Since these signals are received by the ports of the beamformers, they can also be referred to as port signals. In some embodiments, the source or destination of the port signals may be external low noise amplifiers or power amplifiers that situate between the antenna elements and the beamformer.

Figure 8:
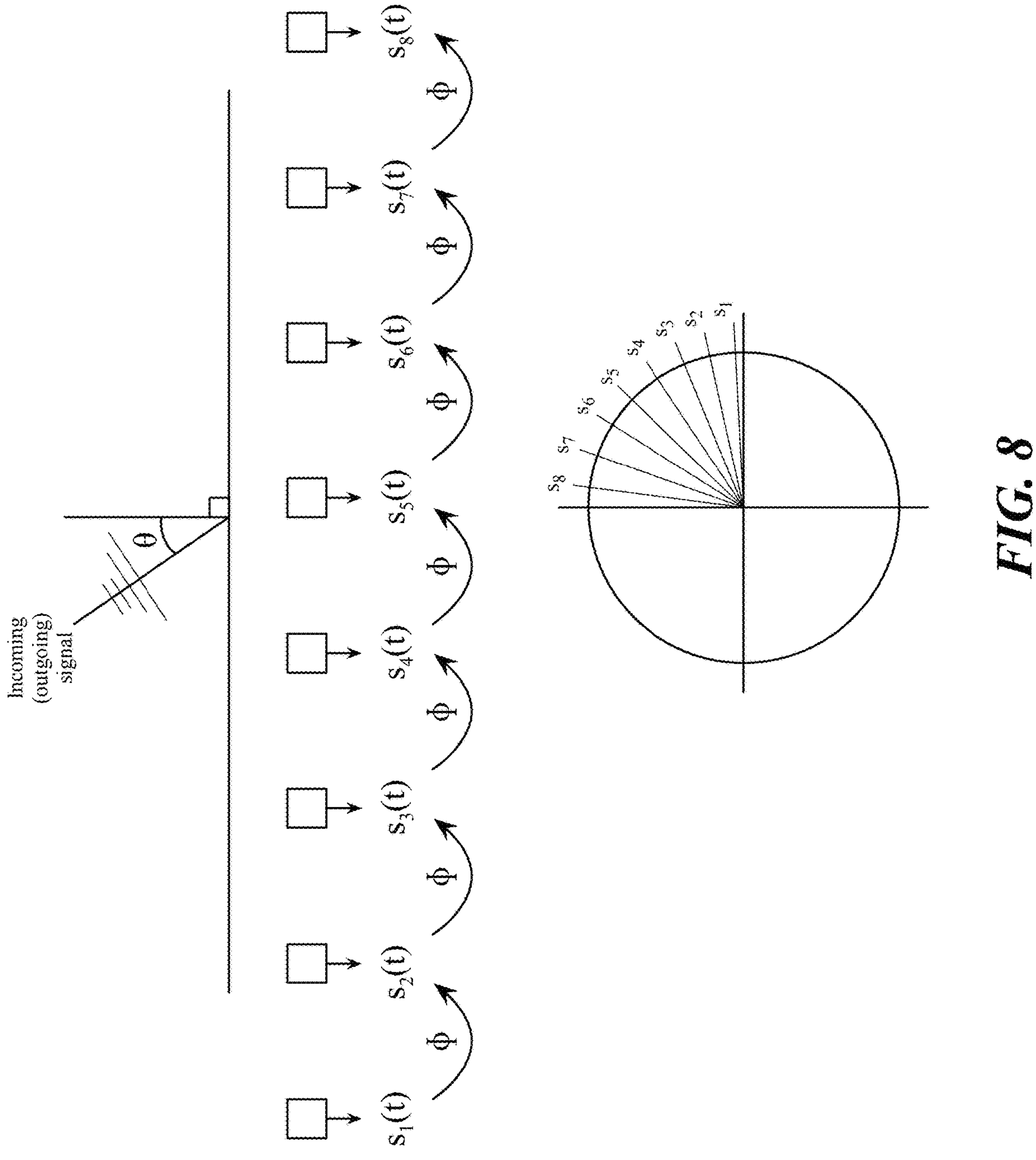
FIG. 8 conceptually illustrates phase relationships between port signals for linear one-dimensional array.

FIG. 8 conceptually illustrates phase relationships between port signals for linear one-dimensional array. The figure illustrates 8 antennas receiving an incident wave front, with an angle of arrival θ. The reception of the incident wave front produces signals at each antenna, $s_i(t)$ for i=[1, 2, . . . , 8], with a phase relationship ϕ. That is, $s_i(t)=s_{i-1}(t+\phi)$, where i identifies the respective channel or antenna from which the signal originates, and t is time normalized by a factor of wavefront's period and multiplied by 2π. Thus, s2(t)=s1(t+ϕ), s3(t)=s1(t+2ϕ), s4(t)=s1(t+3ϕ), s5(t)=s1(t+4ϕ), s6(t)=s1(t+5ϕ), s7(t)=s1(t+6ϕ), s8(t)=s1(t+7ϕ), etc. If d is the distance between two adjacent antenna elements and λ is the wavelength of the incoming (or outgoing) signal, then ϕ=2π(d/λ) sin(θ).

To achieve constructive interference for a particular θ, all the port signals are aligned in phase and then summed together. This concept applies for both received (radiation incident upon the array) and transmitted (radiation emitted from the array) signals. In conventional beamforming systems this phase alignment is achieved using independent phase shifters (PS or Φ.) These phase shifters are capable of generating 0° to 360° phase shifts needed to move a signal to any position on the unit circle and they can be configured independently. The phase shifters may operate at RF frequencies, as is the case in RF and LO beamforming arrays, or at some lower frequency, as is the case in IF, BB, and digital beamforming systems.

Figure 9:
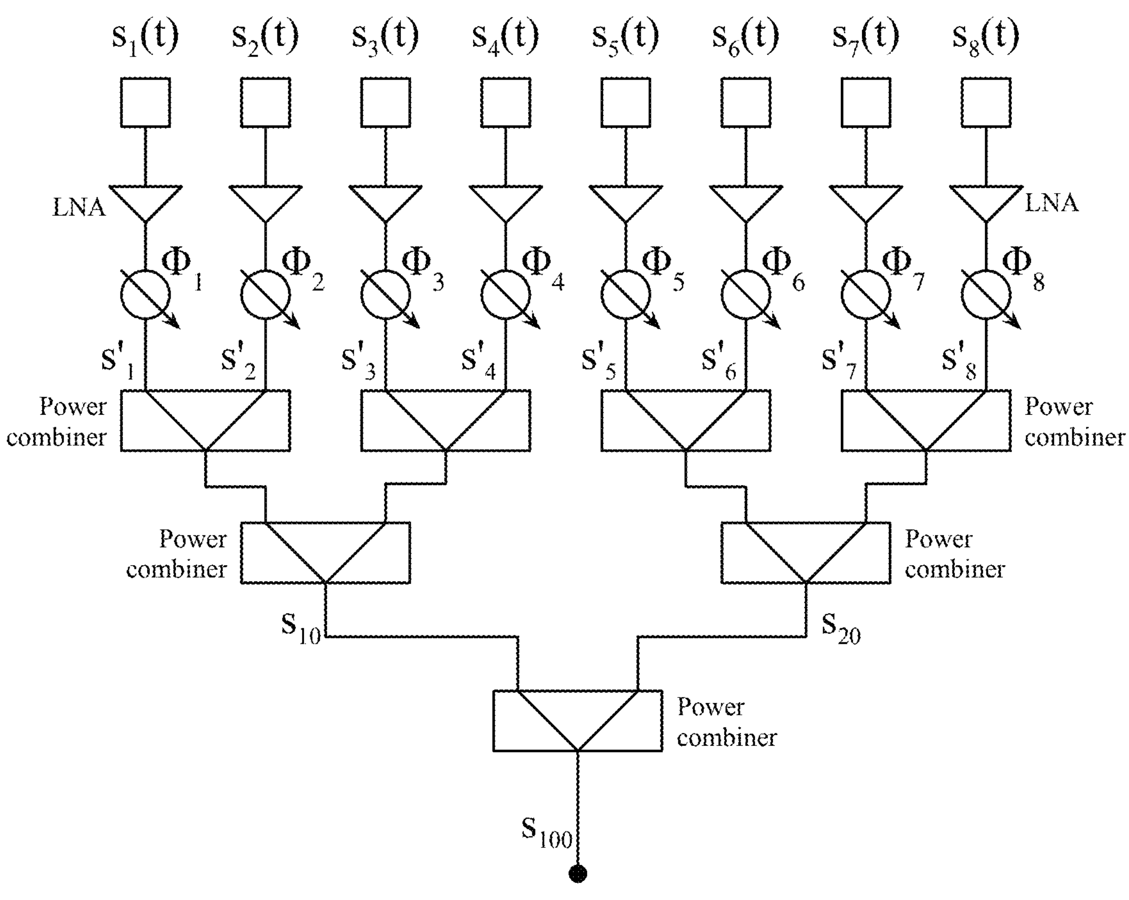
FIG. 9 illustrates a scalable architecture for radio frequency (RF) beamformers that accommodates large phased array.
Figure 9:
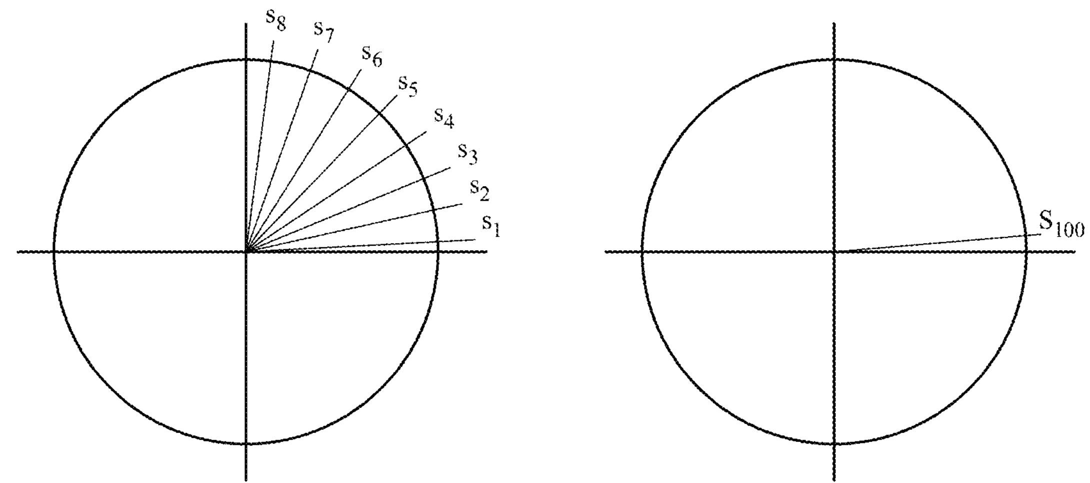

FIG. 9 illustrates a scalable architecture for RF beamformers that accommodates large phased array. The system has a total of eight antenna elements and is being illuminated by a wavefront s(t), with an angle of arrival θ. Each antenna then outputs a signal, $s_i(t)$, in response to the electromagnetic illumination with a phase relationship $s_i(t)=s_{i-1}(t+\phi)$. The signals are optionally amplified by some LNAs to preserve the signal to noise ratio (SNR). Then each signal is fed into its own respective phase shifter $\Phi_i$, and inverse array phase relationship is applied so that the output s'i of all the phase shifters are aligned.

The aligned signals are fed into a power combining network (e.g., a Wilkinson combiner) to produce the desired constructive interference or signal gain. This process can be readily scaled up from 8 to 100 s or even 1000 s of elements. Since the phase shifters align all the signals before power combining begins, power combining can take place over several stages without issue. The structure shown in FIG. 9 therefore enables the realization of very large beamforming networks. The process of beamforming according to FIG. 9 can be understood using Eq. 1, 2, 3, 4:

$$s_i(t) = s(t + (i-1)\phi) = s_{i-1}(t+\phi) \quad \text{Eq. (1)}$$

$$\phi_i = -(i-1)\phi + \phi_k \quad \text{Eq. (2)}$$

-continued $$s_i'(t) = s_i(t+\phi_i) = s(t+\phi_k) \quad \text{Eq. (3)}$$

$$s_{100}(t) = s_1'(t) + s_2'(t) + \ldots + s_8'(t) = 8 * s(t+\phi_k) \quad \text{Eq. (4)}$$

where $\phi_k$ is a phase constant that emerges because the system is under constrained (e.g., there is an extra free or unconstrained variable that could be set arbitrarily.) The same process is applicable to transmit operations as well with the signal flow reversed.

Figure 10:
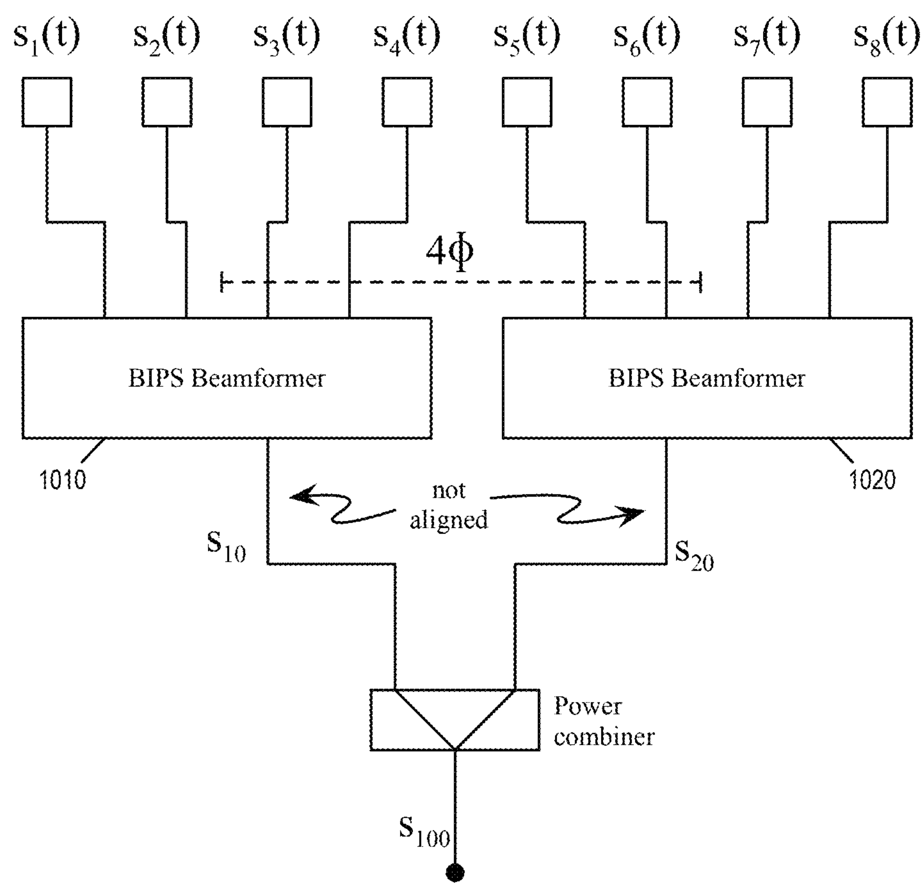
FIG. 10 illustrates an example phased array with BIPS beamformers.
Figure 10:
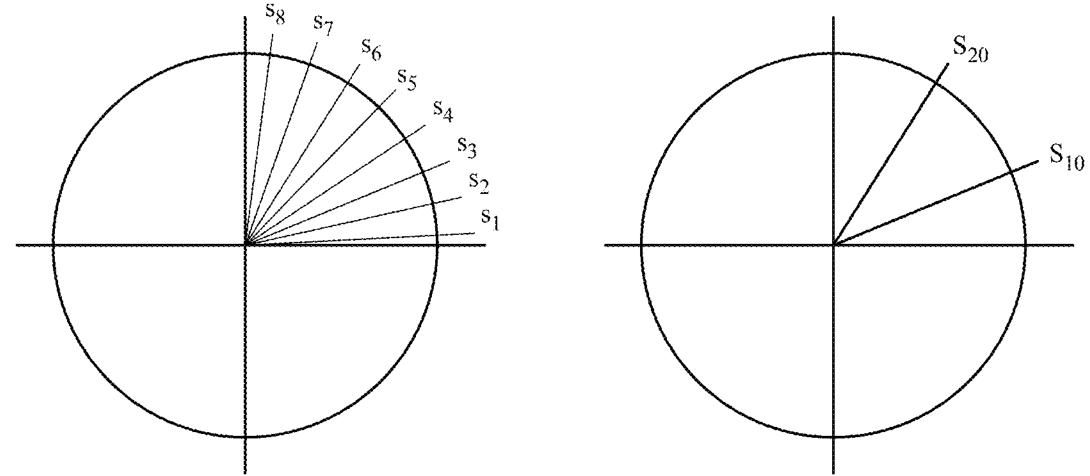

Unlike the phase shifters used in conventional beamforming systems, balance impedance phase shifters (BIPS) are not fully independent so they cannot be used to arbitrarily set the phase at their output. FIG. 10 illustrates an example phased array with BIPS beamformers. The phase of the output signal from a BIPS beamformer is aligned with the phase center of the four signals at the beamformer's input, after factoring in any phase reversals due to the crossover switches. In the example, the signal $s_{10}$ produced by a first BIPS beamformer 1010 is aligned with the phase centers of $s_1$ through $s_4$, while the signal $s_{20}$ produced by a second BIPS beamformer 1020 is aligned with the phase center of $s_5$ through $s_8$. However, the two BIPS beamformers 1010 and 1020 are not fully independent so their corresponding outputs $s_{10}$ and $s_{20}$ cannot be aligned and cannot be properly combined. As a result, simply connecting the BIPS beamformers' outputs through a power combining network, as is done in conventional beamforming systems, will not work, i.e., cannot scale to accommodate large phase arrays.

In the example of FIG. 10, the system has a total of eight antenna elements and is being illuminated by a wavefront s(t), with an angle of arrival θ. Each antenna then outputs a signal, $s_i(t)$, in response to the electromagnetic illumination with a phase relationship $s_i(t)=s_{i-1}(t+\phi)$. Signals 1 through 4 are fed into BIPS beamformer 1010 and signals 5 through 8 are fed into BIPS beamformer 1020. The BIPS beamformers roughly align the phases of each signal to the phase center of their respective signal inputs, then sum them together at the output. The phase center $\phi_{i-j}$ for signals $s_i$ through $s_j$ is calculated according to:

$$\phi_{i-j}=\text{circ mean}(\angle s_i, \angle s_{i+1}, \ldots, \angle s_j) \quad \text{Eq. (5)}$$

As a result, the output of the BIPS beamformer 1010 ($s_{10}$) will be centered around phase center $\phi_{1\text{-}4}$ of signals $s_1(t)$, $s_2(t)$, $s_3(t)$, $s_4(t)$ having a phase offset of 1.5ϕ. The output of the BIPS beamformer 1020 ($s_{20}$) will be centered around phase center $\phi_{5\text{-}8}$ of signals $s_5(t)$, $s_6(t)$, $s_7(t)$, $s_8(t)$ having a phase offset of 5.5ϕ. This means that the outputs of all the BIPS beamformers, Sio are not aligned so feeding them into a power combining network (e.g., a Wilkinson combiner) will not produce the desired constructive interference or signal gain. This prevents the realization of very large beamforming networks using multiple BIPS beamformers. It is also not possible to arbitrarily scale the size of the BIPS beamformer (i.e., the number of ports). BIPS beamformers can only practically scale to N=2 or 4 or maybe 8 elements due to issues with common-mode impedances inducing losses that increase more than linearly with N and excessive impedance transformations which make it difficult to match BIPS beamformers with other circuits. Thus, this approach cannot be feasibly used to bring the low power and low cost benefits of BIPS beamforming to large phased arrays.

A. Cascading BIPS Beamformers

In some embodiments, cascading BIPS beamformers are used to implement large phased arrays. The problematic residual phase between BIPS beamformers are removed by cascading multiple layers of BIPS beamformers in a tree-like configuration. The first layer of BIPS beamformers phase align and combine the sub array elements that form their input ports, while the subsequent layers phase-align and combine the output of the first layer. The subsequent layers of BIPS beamformers are tuned to remove any residual phase shift and provide coherent combination as the array scales in size.

Figure 11:
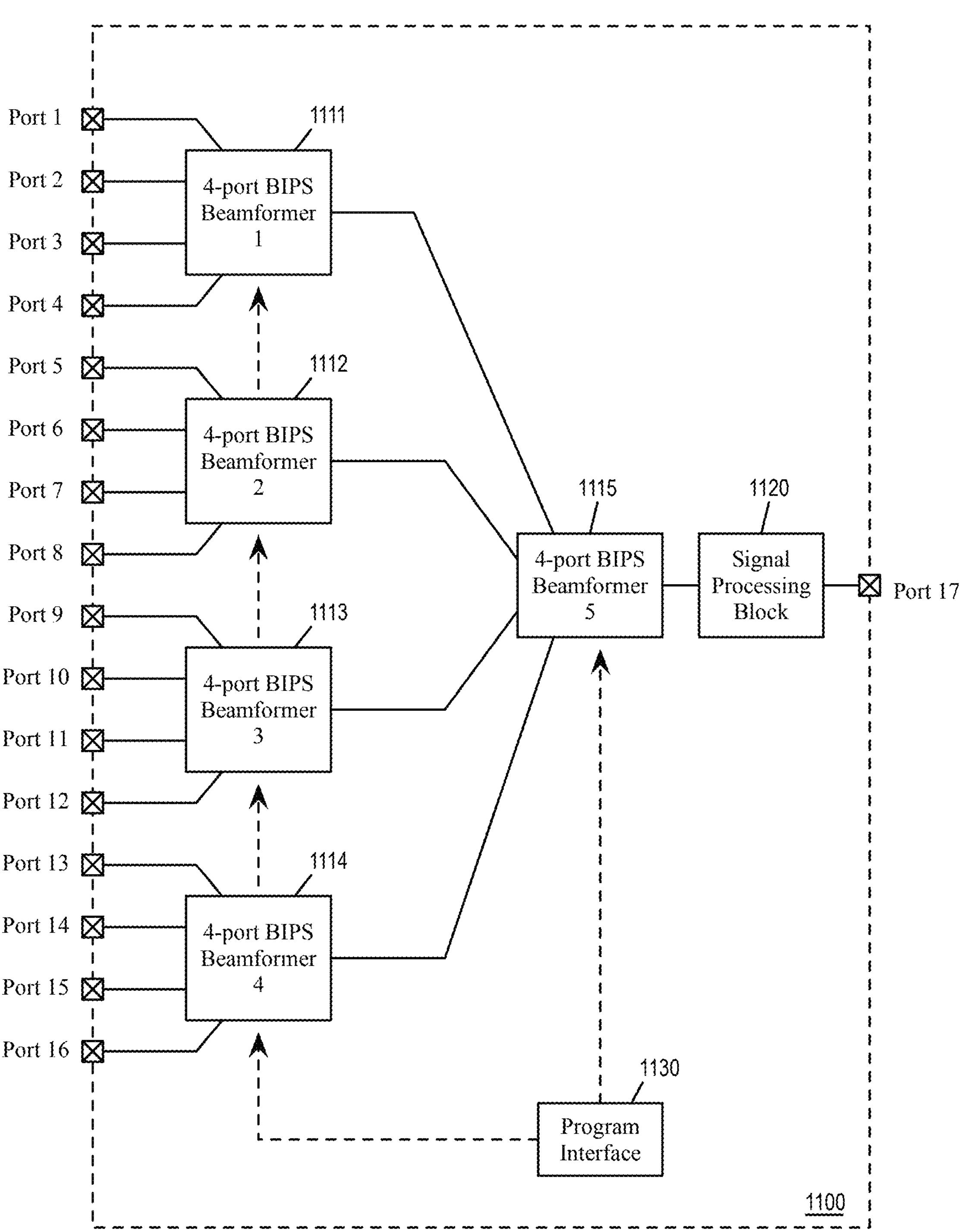
FIG. 11 illustrates an example cascading BIPS beamformer circuit used to accommodate large phased arrays.

FIG. 11 illustrates an example cascading BIPS beamformer circuit 1100 used to accommodate large phased arrays. The cascading BIPS beamformer circuit 1100 has five 4-port BIPS beamformers 1111-1115 that are cascaded to realize a 16-element phased array. BIPS beamformers 1111 through 1114 are frontend beamformers connected to beamforming ports of the array, ports 1 through 16. The BIPS beamformer 1115 is a secondary or cascaded beamformer connected to BIPS beamformers 1111 through 1114. A program interface 1130 configures each BIPS beamformer 1111-1115 to apply a respective phase shift.

During receive operations, the frontend beamformers 1111-1114 are configured to apply respective phase shifts on signals received from the beamforming ports (ports 1-16). The secondary BIPS beamformer 1115 is configured to remove residual phase shift from the signals of the frontend BIPS beamformers 1111-1114 and constructively combine those signals. The output of the secondary BIPS beamformer 1115 may then feed a signal processing block 1120 (e.g., an LNA), which in turn feeds the rest of the signal chain through a summation port (port 17.)

During transmit operations, the signal flows in reverse, as the signal processing block 1120 (e.g., a PA) provide signal from the summation port (port 17) to feed the secondary BIPS beamformer 1115. The secondary BIPS beamformer 1115 applies the residual phase shift on the signal and split the signal to feed the four frontend BIPS beamformers 1111-1114. The four BIPS beamformers 1111-1114 applies respective phase shift to the signals received from the secondary BIPS beamformer 1115 before transmitting on beamforming ports (ports 1-16).

The circuit 1100 is a 16-element receive phased array. However, the circuit topology applies equally to transmitters and phased arrays with more or less elements. The number of elements in the array may be adjusted by increasing or decreasing the number of ports in the BIPS beamformers (i.e., the size of the sub-array, let it be M) and/or the number of BIPS beamformers in the cascaded structure (i.e., the number of sub-arrays, let it be O). The example circuit 1100 is also applicable to different RF frontend topologies, such as mixer-first receivers/transmitters, direct-conversion receivers/transmitters, etc. The example circuit may also use different types of BIPS beamformers in the cascade including series-connected and/or shunt-connected BIPS beamformers. Each of the BIPS beamformer 1111-1115 may be a series-connected BIPS beamformer described by reference to FIGS. 3A-B above, or a shunt-connected BIPS beamformer described by reference to FIGS. 7A-B above.

BIPS beamformers can only practically scale to M=2, or 4, maybe 8 elements since their insertion losses increase more than linearly with N. However, using the cascaded layers of BIPS beamformers, as shown in FIG. 11, the insertion losses scale logarithmically. This means that a larger phased array (e.g., more than antenna 8 elements) can be realized by using the cascaded layers of BIPS beamformers for a given acceptable insertion loss, which is unachievable by simply using a BIPS beamformer with more ports.

Furthermore, the cascading BIPS beamformer circuit 1100 presents opportunities for managing impedance variation as the size of the network grows. Such opportunities for managing impedance variation is not available for a single BIPS beamformer with more ports. Series-connected BIPS beamformers provide an impedance step-up and experience an impedance drop as they tune away from boresight. Shunt-connected BIPS beamformers provide an impedance step-down and experience an impedance rise as they tune away from boresight. By cascading different combinations of series- and/or shunt-connected BIPS beamformers, an optimal impedance can be presented at an RF signal processing block (at e.g., port 17 of circuit 1100). Changes/variations that might occur as a function of beam angle can also be flattened out.

Circuits with cascading BIPS beamformers allows for the realization of large phased arrays with significantly lower power consumption and cost than possible with conventional beamforming systems. By cascading multiple layers of passive BIPS beamformers, a large, fully-passive beamforming network can be implemented and used to realize a large phased array. This brings the power and cost benefits of BIPS beamformers seen in smaller phased arrays to larger phased arrays, where saving power and cost is even more crucial. The loss for the cascaded BIPS beamformer circuit described in this section scales as a log function of its size, making it possible to realize much larger networks for a given insertion loss.

B. Combining BIPS Beamformers and (Conventional) RF Beamformers

In some embodiments, a beamformer structure combining BIPS beamformers and conventional RF beamformers is used to implement large phased arrays, as the problematic residual phase between BIPS beamformers is addressed by such a combined circuit. Specifically, a first layer of BIPS beamformers phase align and combine the signals from their input ports (in a first stage phase shifting operation), while a second layer of RF beamformers phase align and combine the output of the first layer (in a second stage phase shifting operation). The second layers of RF beamformers are tuned to remove any residual phase shift and feed the aligned signals into a combiner network to provide coherent power summation. In other words, the second layer of RF beamformers receives output of the first layer as intermediate signals to generate amplified, filtered, appropriately timed, and/or phase shifted signals as the output of the beamforming circuit.

In some embodiments, the combined structure of BIPS and RF beamformers is used as a tile that can be duplicated as the array scales in size. These circuits reduce both the number of RF beamformer blocks and front-end amplifiers (LNAs, PAs) by a factor of M, resulting in a system that consumes roughly M times less power and has M times less expensive circuit blocks. Notably, because the RF beamforming techniques employed may be active and provide gain, this approach can achieve much lower losses on the sensitive antenna node than the cascading BIPS beamformers described in Section III-A. However, because the RF beamforming techniques employ active devices, they will naturally consume more power than the fully passive approaches of the cascading BIPS beamformer. Some embodiments therefore use a combination of approaches to realize larger high-performance phased arrays based on trade-offs between the front-end losses and the power savings.

Figure 12A:
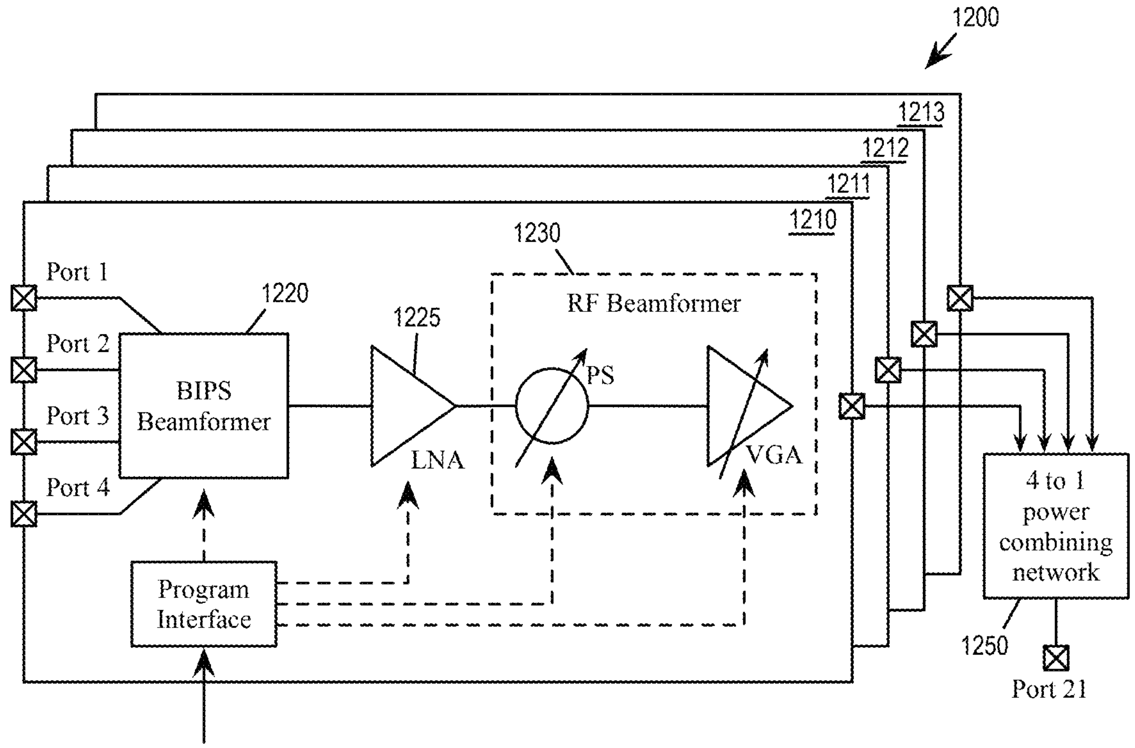
FIGS. 12A-B illustrate a combined BIPS and RF beamformer.
Figure 12B:
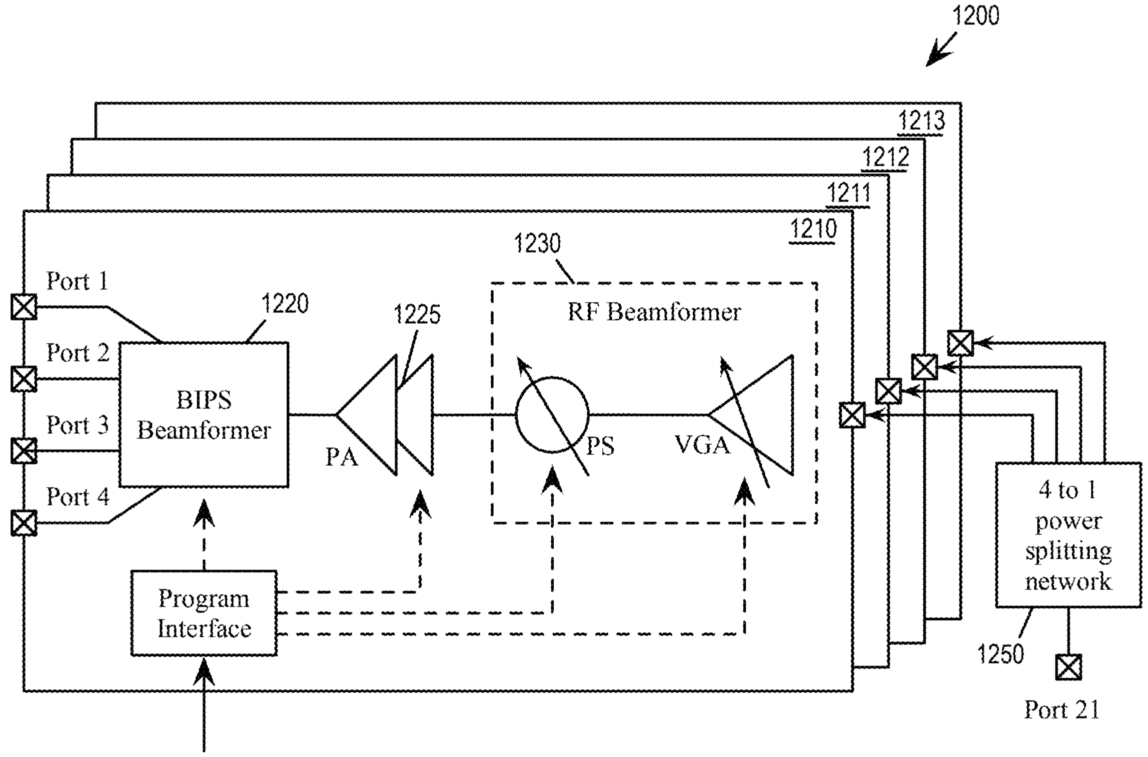

FIGS. 12A-B illustrate a combined BIPS and RF beamformer. The combined BIPS and RF beamformer 1200 can be used to accommodate large RX and TX phase arrays with BIPS beamformer on antenna nodes. As illustrated, the combined BIPS and RF beamformer 1200 includes a 4-port BIPS beamformers 1220 cascaded with a conventional RF beamformer 1230 (phase shifter @, and VGA) to form a tile 1210. The BIPS beamformer 1220 may be a series-connected BIPS beamformer described by reference to FIGS. 3A-B above, or a shunt-connected BIPS beamformer described by reference to FIGS. 7A-B above.

The tile 1210 is duplicated four times (as tiles 1210-1213) to implement a 16-element phased array. The BIPS beamformers 1220 is a frontend beamformer connected to the antenna elements of the array at beamforming ports 1 through 16. The RF beamformer 1230 is a secondary or cascaded beamformer connected to receive the intermediate output of the BIPS beamformer 1220 to generate an amplified signal as output. The RF beamformer 1230 has RF phase shifter configured to remove any residual phase shift in the amplified signal. The amplified signal output of the RF beamformer 1230 is combined with the amplified output signals of other RF beamformers by a RF power combiner 1250 to produce a final output at a summation port 21 of the combined BIPS and RF beamformer 1200. In this example, within one tile 1210, an amplifier 1225 (LNA or PA) is placed in between the BIPS beamformer 1220 and the RF beamformer 1230 to maximize SNR or output power. A 4-to-1 RF power combining or splitting network 1250 (e.g., a Wilkinson's combiner) interconnects the duplicated tiles 1210-1213 with the summation port 21 for both receive and transmit operations. FIG. 12A shows the duplicated tiles 1210-1213 being used to realize a 16-element receive phased array. FIG. 12B shows the duplicated tiles 1210-1213 being used to realize a 16-element transmit phase array.

Figure 13A:
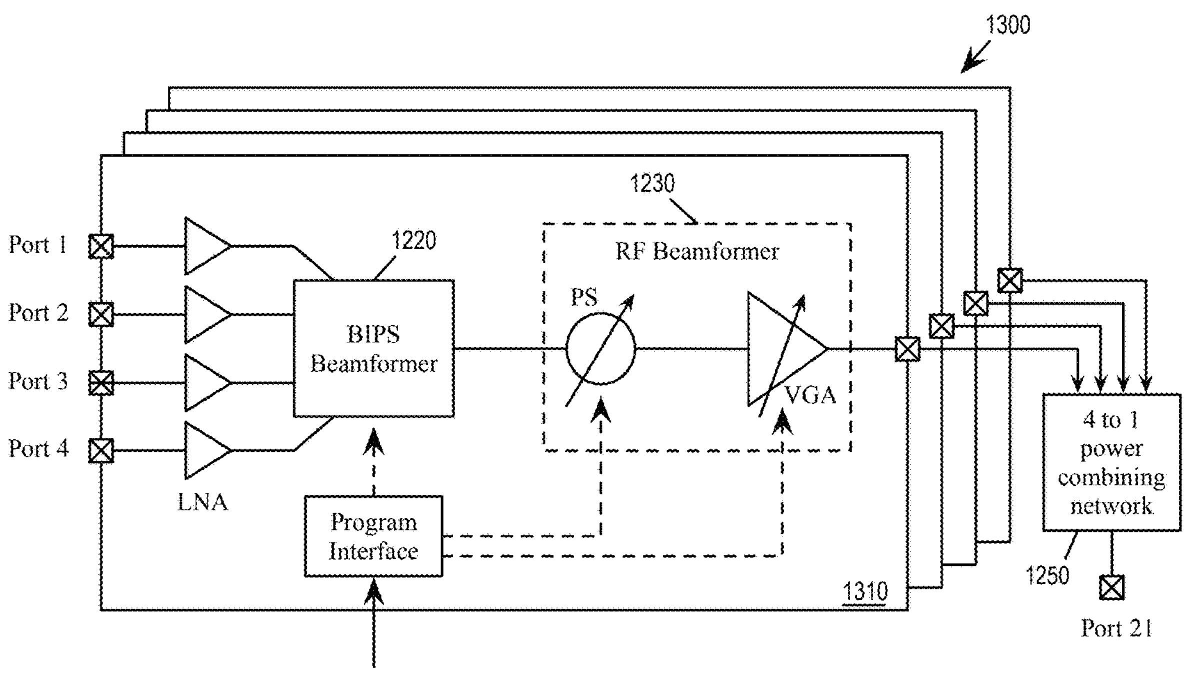
FIGS. 13A-B illustrate combined BIPS and RF beamformer circuit in which amplifiers are included on antenna nodes.
Figure 13B:
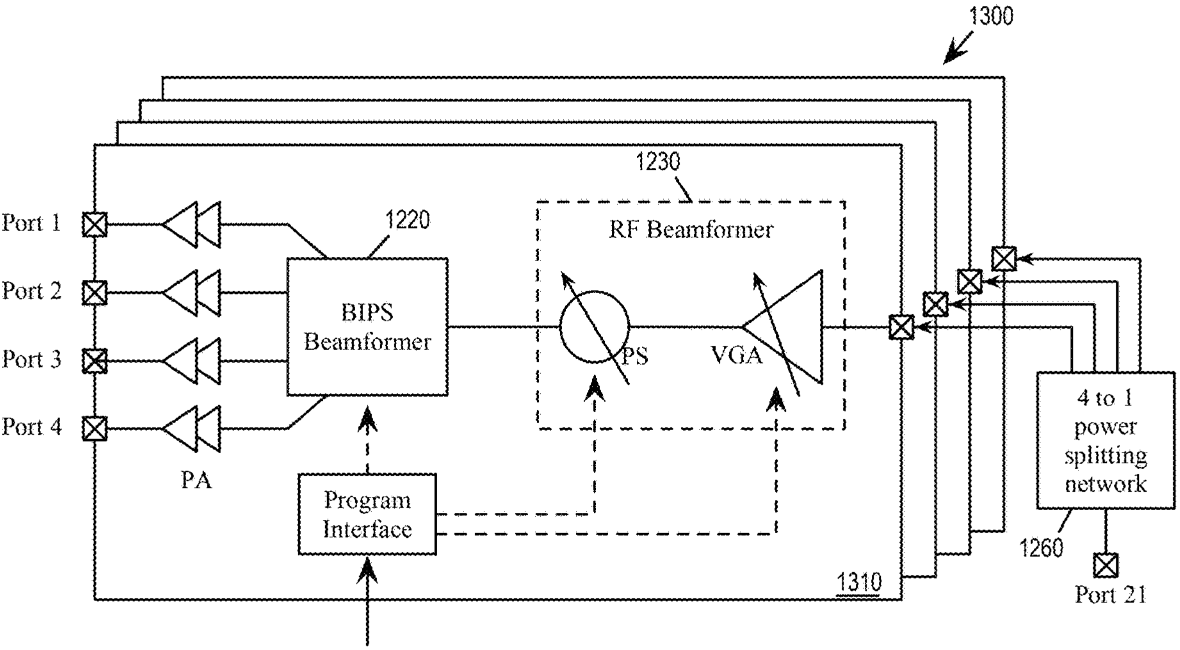

In certain situations, it may be desirable to mitigate the frontend losses further by placing the RF amplifiers (e.g., LNAs, PAs) on sensitive antenna nodes instead of connecting the beamforming ports directly to the BIPS beamformers. FIGS. 13A-B illustrate combined BIPS and RF beamformer circuit 1300 in which LNAs and PAs are included on antenna nodes for receive and transmit operations.

In the example combined BIPS and RF beamformer circuits 1300, the RF amplifiers are placed on the sensitive antenna nodes 1310 to further mitigates any drop in SNR or efficiency due to passive losses in the BIPS beamformer, while still reducing the number of conventional beamforming elements needed in the array by a factor of M. However, this approach does require more frontend amplifiers and so will consume more power and circuit area. This compromise between frontend performance and power savings can be used to realize larger high-performance phased arrays.

The beamformer responsible for removing the residual phase in this technique may be implemented with any beamforming technology that utilizes fully independent phase shifters capable of 0 to 360° phase shifts. For example, the conventional RF beamformer may be implemented using RF beamforming, as shown in the previous examples, or by using BB (baseband), IF (intermediate frequency), LO (local oscillator), or digital beamforming techniques.

Figure 14:
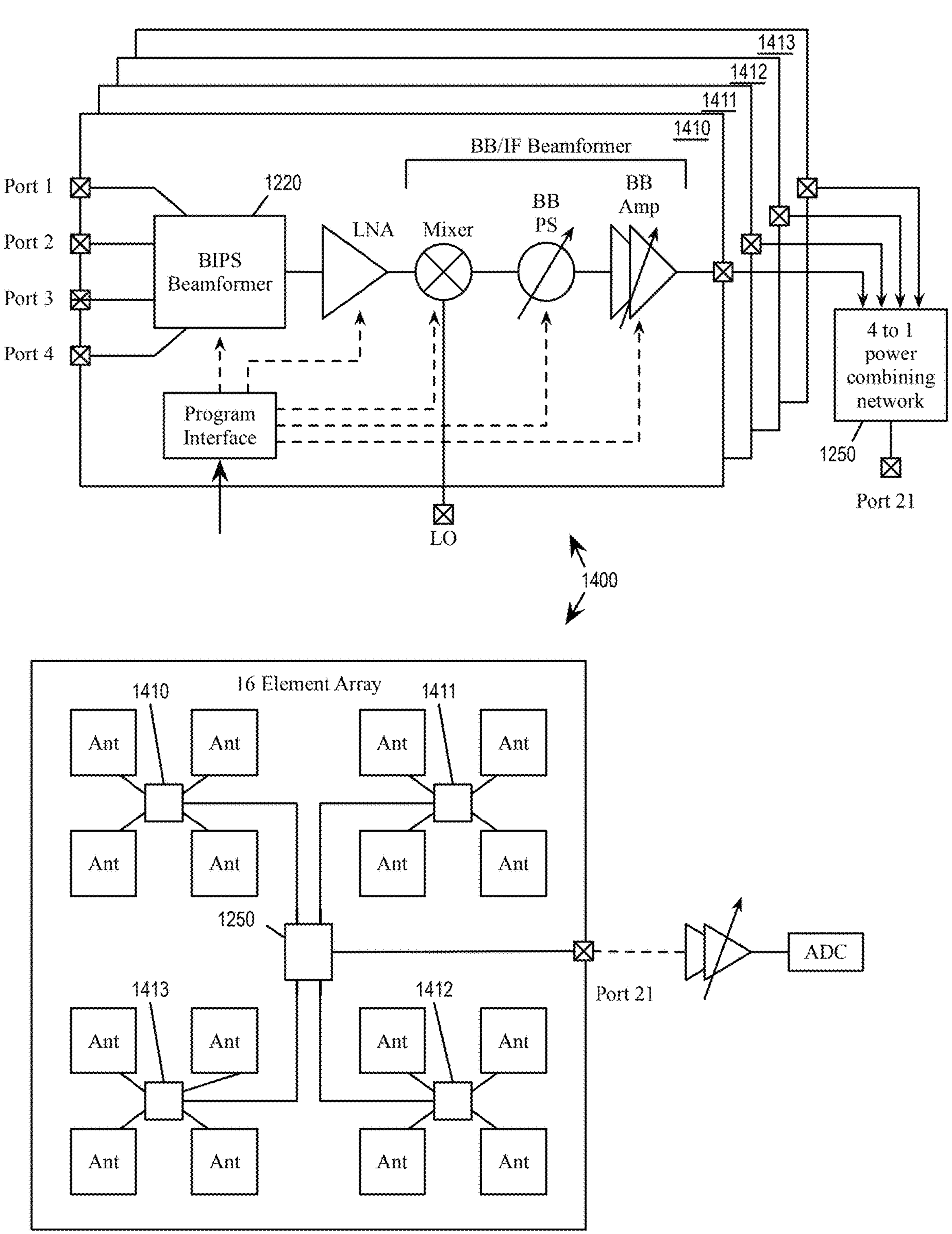
FIG. 14 illustrates an example baseband (BB) or intermediate frequency (IF) beamforming circuit.
Figure 15:
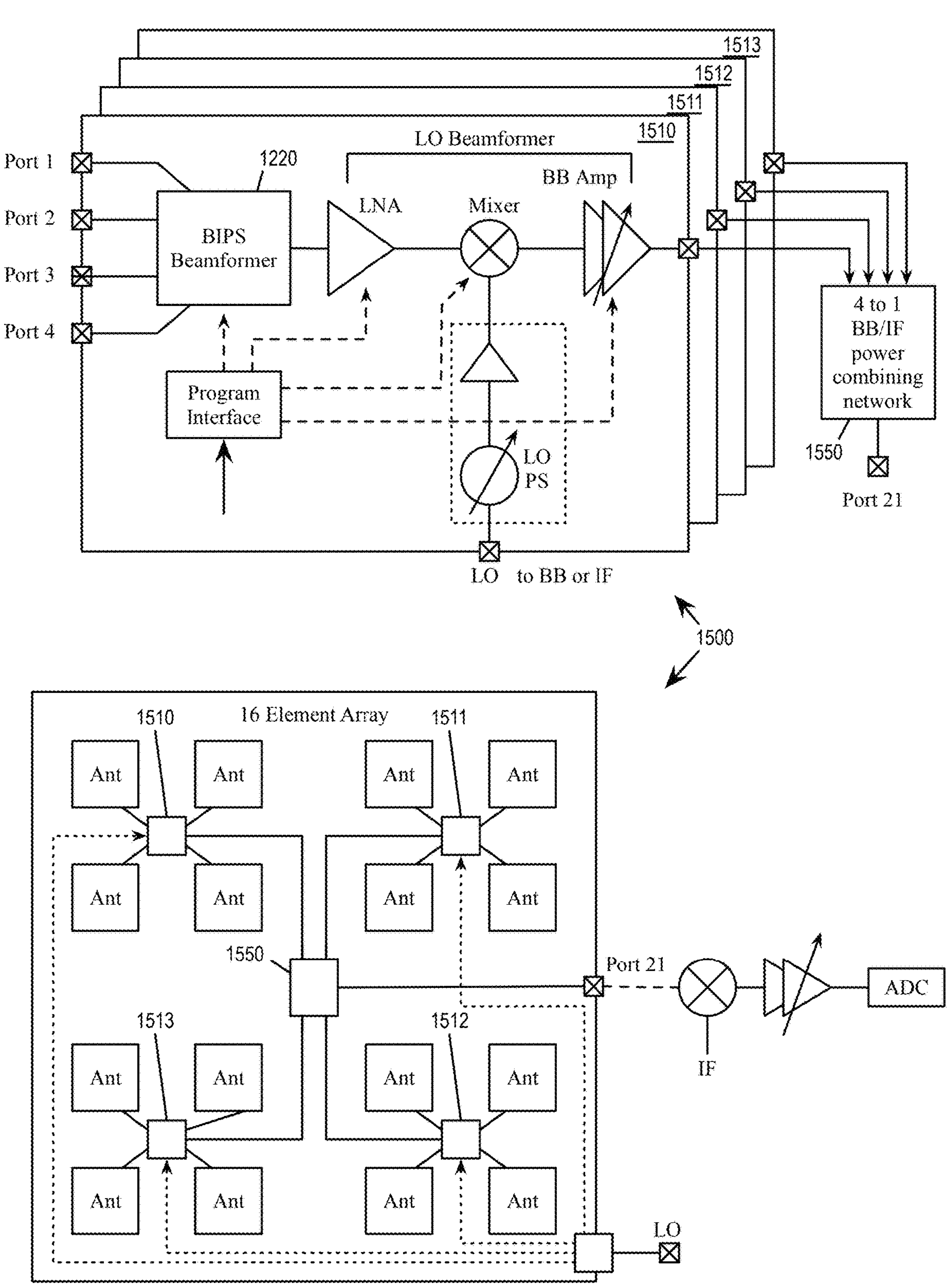
FIG. 15 illustrates an example LO (local oscillator) beamforming circuit.
Figure 16:
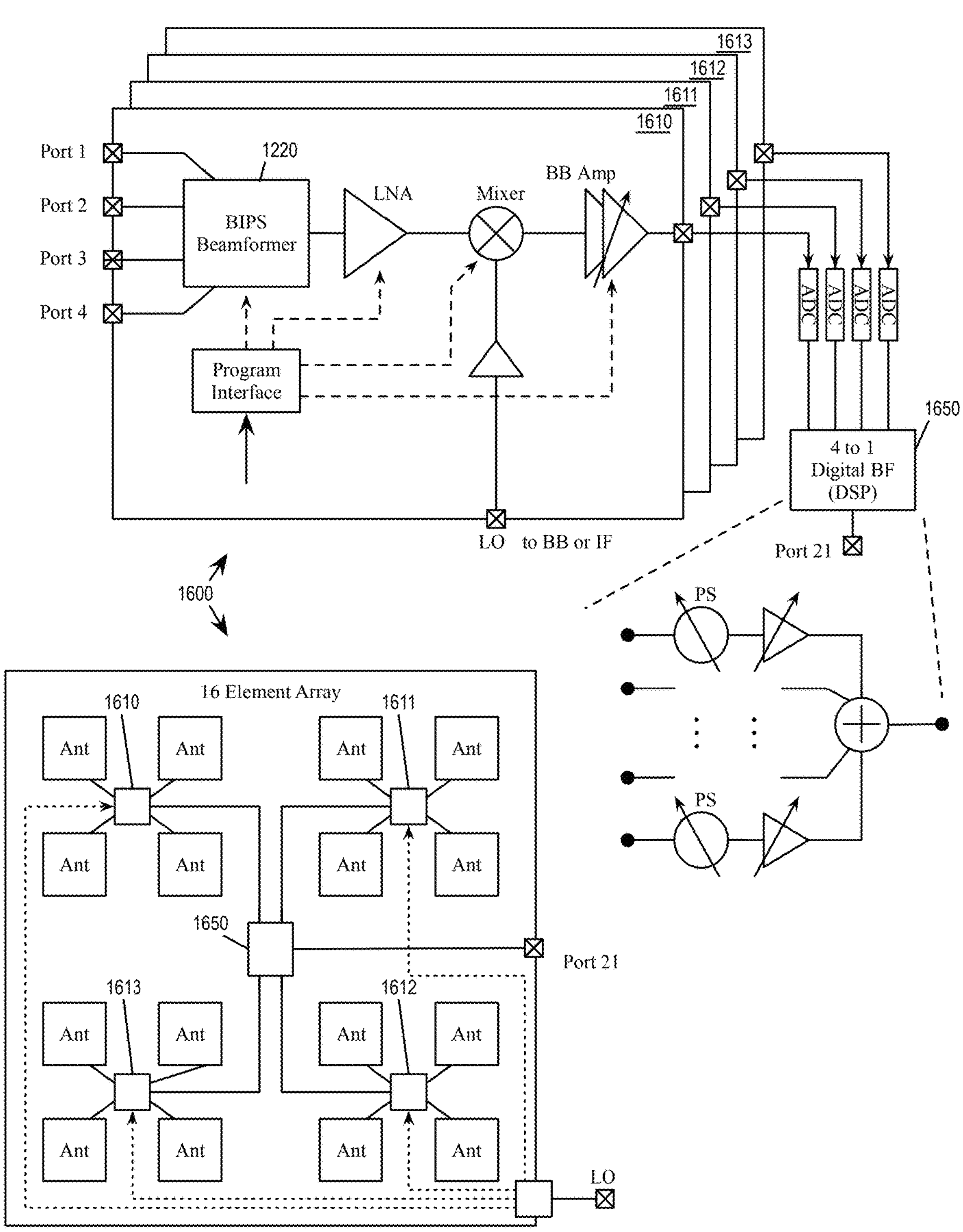
FIG. 16 illustrates an example digital beamforming circuit.

FIG. 14 illustrates an example BB/IF (baseband or intermediate frequency) beamforming circuit 1400. FIG. 15 illustrates an example LO (local oscillator) beamforming circuit 1500. FIG. 16 illustrates an example digital beamforming circuit 1600. Each of FIGS. 14-16 illustrates a schematic view (top) and a layout view (bottom) of a cascade of BIPS beamformers 1220 and LO beamformers used to accommodate large RX phased arrays. All of these circuits 1400-1600 can also be made to incorporate a transmit/receive (T/R) switch to facilitate time domain duplex (TDD) architectures.

Figure 17:
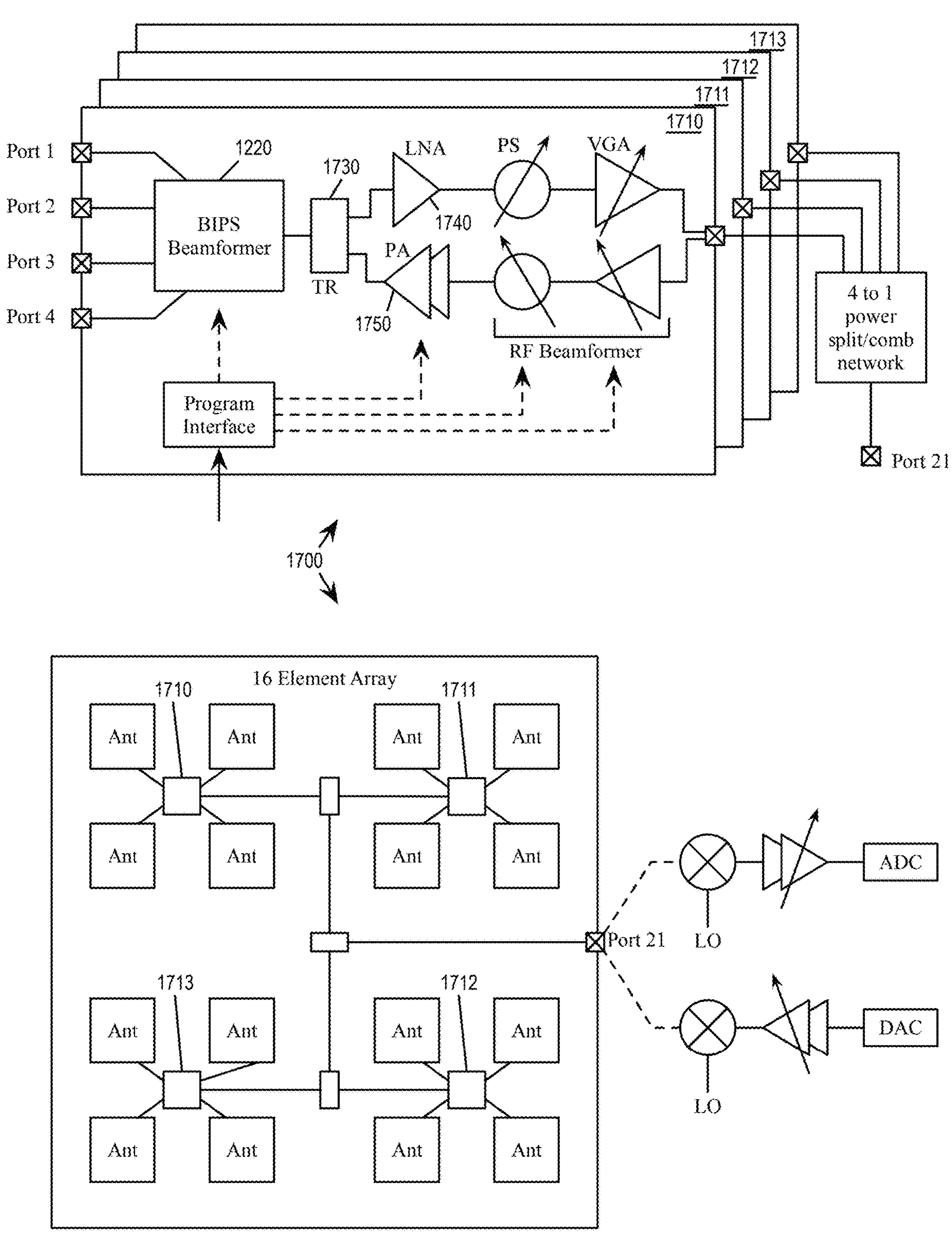
FIG. 17 illustrates an example RF beamforming circuit with a time domain duplex (TDD) transceiver.

FIG. 17 illustrates an example RF beamforming circuit with a TDD transceiver. The figure illustrates a schematic view (top) and a layout view (bottom) of a combined BIPS and RF beamformers 1700 used to accommodate large TRX (TX and RX) phased arrays. A TR switch 1730 is implemented in between the BIPS Beamformer 1220 and a LNA 1740 and a PA 1750. The TR switch may also be implemented in between the BIPS Beamformer 1220 and the ports 1-4.

Additionally, the combined BIPS and RF beamforming circuit topology applies equally to transmitters and phased arrays with more or less elements. The number of elements in the array may be adjusted by increasing or decreasing the number of ports in the BIPS beamformers (i.e., the size of the sub-array, M) and/or the number of tiles (i.e., the number of sub-arrays, O). The example circuit is also applicable to different RF frontend topologies, such as mixer-first receivers/transmitters, direct-conversion receivers/transmitters, etc. The circuit tiles may also use different types of BIPS beamformers, including series-connected and shunt-connected BIPS beamformers.

These circuits allow for the realization of large phased arrays with significantly lower power consumption and cost than possible with conventional (RF) beamforming systems. The low power and low cost benefits of BIPS beamformers can be realized in large phased arrays without cascading passive losses from BIPS beamformers. Even though the losses in a cascaded BIPS beamforming circuit described in Section III-A scale logarithmically with network size, for some high-performance or very large phased array applications this may still be unacceptable. By using tiered combinations of BIPS beamformers and conventional (RF) beamformers, the frontend passive losses are fixed at the level of the smaller BIPS beamformer. However, since the combined BIPS and RF beamforming circuits described in this section require active beamforming components, they may consume more power than the cascaded BIPS beamforming circuits, but the smaller losses allow for higher RF performance (in terms of e.g., receiver sensitivity, transmitter efficiency) for a given aperture size.

C. Phase Shift Determination

Some embodiments of the disclosure provide a process for removing a residual phase shift, and enabling the scaling of the BIPS beamformers to larger receive arrays. The process (i.e., algorithm) determines the appropriate phase shift for the BIPS beamformers and conventional beamformers based on desired beamforming characteristics and array geometry.

Figure 18A:
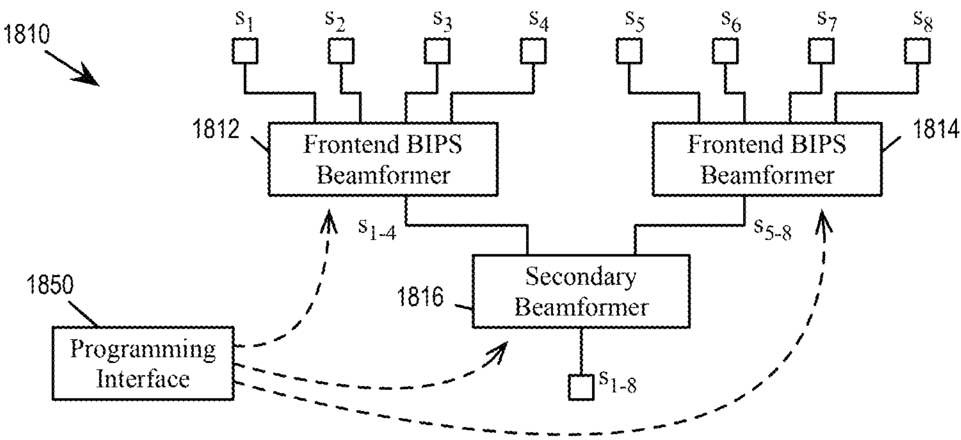
FIGS. 18A-B illustrate phase shifting operations for removing residual phase in large phased arrays.
Figure 18B:
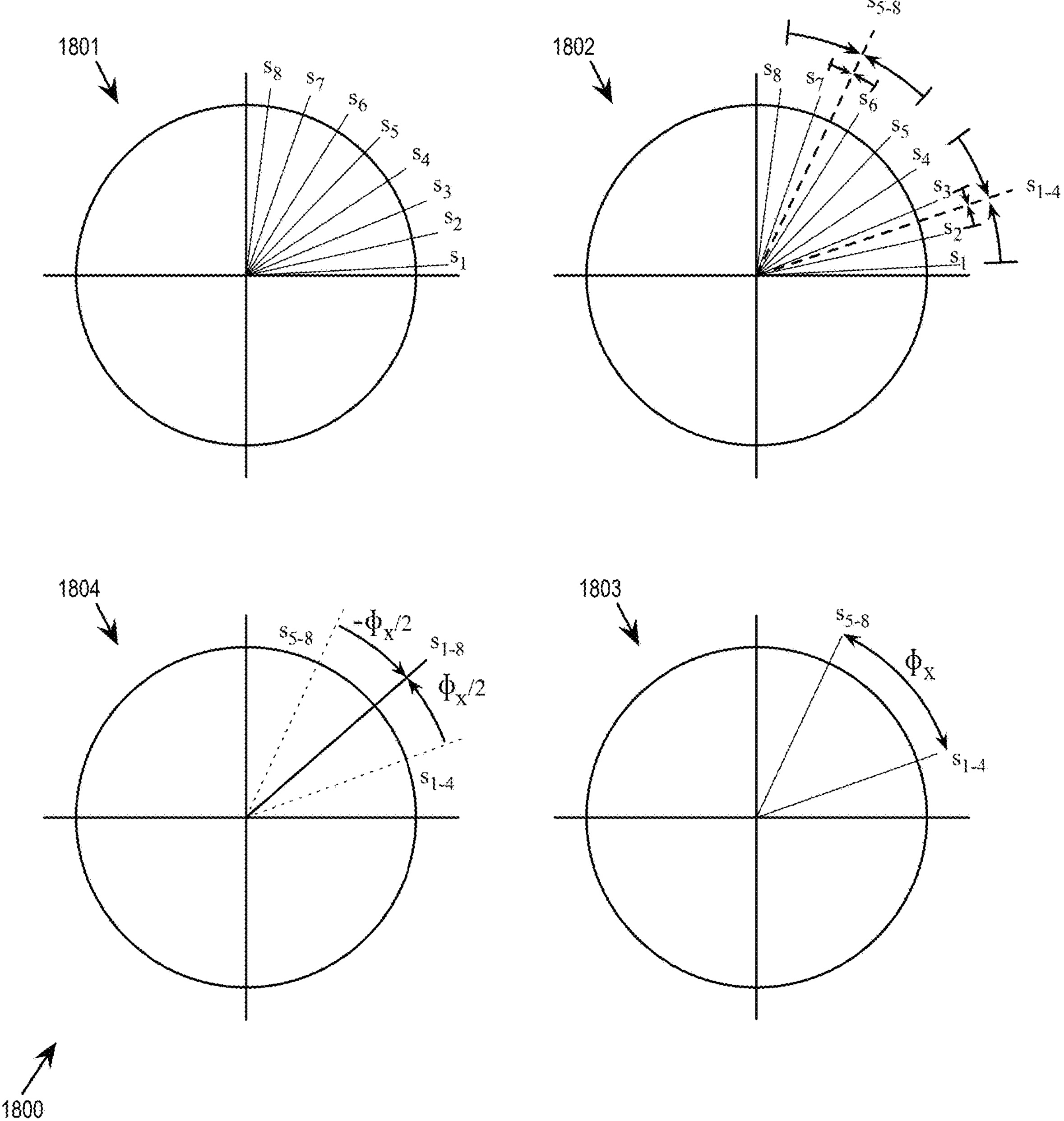

FIGS. 18A-B illustrate phase shifting operations for removing the residual phase for enabling the scaling of BIPS beamformers to large phased arrays. The phase shifting operations work for any channel type (e.g., planar waves, IID channels, etc.) or array configuration (e.g., rectangular lattice, triangular lattice, conformal arrays, etc.). FIG. 18A illustrates an example beamforming system 1810 for which phase shifting operations may be performed. The example beamforming system 1810 includes a 1-D linear sub-array having 8 beamforming ports for receiving 8 port signals $s_1$ through $s_8$. The 1-D linear sub-array has two frontend 4-port BIPS beamformers 1812 and 1814, and a secondary beamformer 1816. The phase shifting operations may be driven by a computing device that configures the frontend and secondary beamformers 1812-1816 through a programming interface 1850. FIG. 18B shows stages 1801-1804 of the phase shifting operations, which are applicable to both transmit and receive operations.

During receive operations, the frontend 4-port BIPS beamformer 1812 receives port signals $s_1$ through $s_4$ to generate an intermediate signals $s_{14}$; the frontend 4-port BIPS beamformer 1814 receives port signals $s_5$ through $s_8$ to generate an intermediate signals $s_{5-8}$. The secondary beamformer 1816 combines the intermediate signals $s_{1-4}$ and $s_{5-8}$ to become a final signal $s_{1-8}$ at a summing node or summation port. The beamformers 1812, 1814, and 1816 apply respective phase shifts to the port signals and the intermediate signals. For receive, the beamforming system 1810 performs the following operations to apply the phase shifts:

(1) The beamforming system determines the relative phase for each of the input signals to the frontend BIPS beamformer sub arrays by direct sensing or prediction using the known geometry of the array, desired beam angle, and any available calibration data. Stage 1801 shows the predicted relative phases of signals $s_1$ through $s_8$ along a unit circle.

(2) The beamforming system performs balanced impedance tuning to align and combine the signals at the input of the frontend BIPS beamformer sub-arrays. Stage 1802 conceptually illustrates a first stage tuning operations to create a first combined signal $s_{14}$ (for $s_1$ through $s_4$) and a second combined signal $s_{5-8}$ (for $s_5$ through $s_8$) at the two outputs of the two frontend BIPS beamformers. These tuning operations configure the frontend BIPS beamformers' crossover switches and programmable impedances or admittances to provide constructive interference in the desired direction on the sub-array level.

(3) The beamforming system determines the relative phase for each of the output signals from the front-end BIPS beamformer sub-arrays (e.g., the combined signals $s_{1-4}$ and $s_{5-8}$) by direct sensing or prediction using the known geometry of the array, desired beam angle, and any available calibration data. Stage 1803 shows the relative phase dx between the two combined signals $s_{1-4}$ and $s_{5-8}$.

(4) For circuits in the cascaded BIPS beamformer described in Section III-A, the beamforming system performs balanced impedance tuning to align and combine the signals at the input of the secondary BIPS beamforming circuits. This operation configures the secondary BIPS beamformers' crossover switches and programmable impedances or admittances to provide constructive interference in the desired direction on the array level. The signals can now be combined using an appropriate power or signal combiner. Stage 1804 shows the final combined signal $s_{1-8}$ derived from $s_{1-4}$ and $s_{5-8}$ after the secondary BIPS beamformers' crossover switches and programmable impedances or admittances are correspondingly configured. For the circuits in the combined BIPS and RF beamformer described in Section III-B, the relative phase shift determined from steps (1), (2) and (3) can be directly applied to the output signals from the frontend BIPS beamformers (e.g., BIPS beamformer 1220) to the secondary RF beamformers (e.g., RF beamformer 1230).

The same operations described above proceed in reverse for transmit. During transmit operations, the secondary beamformer 1816 receives input signal $s_{1-8}$ from the summing node or summing port and split the signal into intermediate signals $s_{1-4}$ and $s_{5-8}$. The frontend 4-port BIPS beamformer 1812 receives the intermediate signal $s_{1-4}$ to generate the port signals $s_1$ through $s_4$. The frontend 4-port BIPS beamformer 1814 receives the intermediate signal $s_{5-8}$ to generate the port signals $s_5$ through $s_8$. The beamformers 1812, 1814, and 1816 apply respective phase shifts to the port signals and the intermediate signals. For transmit, the beamforming system 1810 performs the following operations to apply the phase shifts:

(1) The beamforming system predicts the relative phase for each of the signals into the frontend BIPS beamformer sub-arrays using the known geometry of the array, desired beam angle, and any available calibration data. Stage 1801 shows the predicted relative phases of signals $s_1$ through $s_8$ along a unit circle.

(2) For the cascaded BIPS circuits described in Section III-A, the beamforming system performs balanced impedance tuning to align the signals at the output of the secondary BIPS beamformers with the desired output phases. This step configures the secondary BIPS beamformers' crossover switches and programmable impedances or admittances to provide constructive interference in the desired direction on the array level. Stage 1804 shows the final combined signal $s_{1-8}$ derived from $s_{1-4}$ and $s_{5-8}$ after the secondary BIPS beamformers' crossover switches and programmable impedances or admittances are correspondingly configured. For the combined BIPS and RF circuits described in Section III-B, the relative phase shift determined from the previous step (1) can be directly applied to the output signals from the frontend BIPS beamformers.

(3) The beamforming system predicts the desired relative phase for each of the output signals from the frontend BIPS beamformer sub-array using the known geometry of the array, desired beam angle, and any available calibration data. Stage 1803 shows the relative phase $\phi_x$ between the two output signals $s_{1-4}$ and $s_{5-8}$ of the frontend BIPS beamformer sub-array.

(4) The beamforming system performs balanced impedance tuning to align the signals at the output of the frontend BIPS beamformer sub-arrays. Stage 1802 conceptually illustrates the tuning operations to create a first combined signals for $s_1$ through $s_4(s_{1-4})$ and a second combined signal for $s_5$ through $s_8$ ($s_{5-8}$). This operation configures the frontend BIPS beamformers' crossover switches and programmable impedances or admittances to provide constructive interference in the desired direction on the sub-array level.

D. Eliminating Phase Shifters MSB

The circuits in Section III-A and III-B can be improved by incorporating 180° phase shift functionality into the frontend BIPS beamformer crossover switches, and by removing the 180° phase shift functionality from the secondary beamformer stages.

For the cascading BIPS beamforming circuit described in Section III-A, by dual purposing the crossover switches (e.g., the crossover switch 520 in the BIPS 421-424) in the frontend BIPS beamformer(s) (e.g., BIPS beamformer 1111), the lossy crossover switches can be eliminated from the cascaded BIPS beamformers (e.g., BIPS beamformer 1115). Instead of relying on the crossover switches in the cascaded BIPS beamformers, the states of all crossover switches in the frontend BIPS beamformers may be inverted to realize a 180° phase shift.

Figure 19:
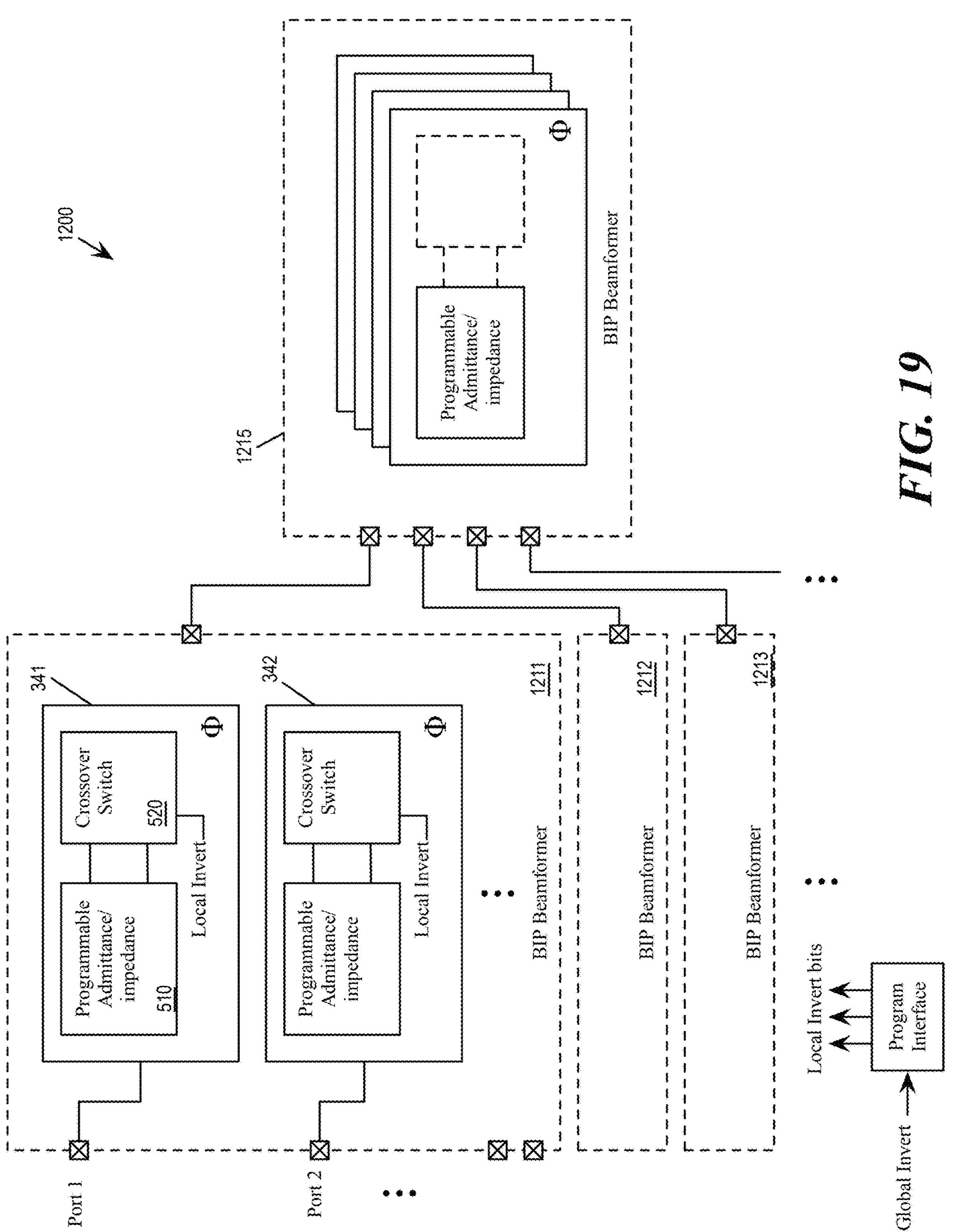
FIG. 19 illustrates the dual purposing of crossover switches in a cascading BIPS beamforming circuit.

FIG. 19 illustrates the dual purposing of crossover switches in a cascading BIPS beamforming circuit. The figure illustrates a portion of the cascading BIPS beamforming circuit 1100, for some embodiments in which the crossover switches in frontend BIPS phase shifters are dual purposed to achieve 180° phase shift. As illustrated, the cascading BIPS beamforming circuit 1100 includes several (4-port) BIPS beamformers 1111-1115 (the BIPS beamformer 1114 is not illustrated) The cascading BIPS beamformers 1111-1114 are used as frontend BIPS beamformer while the BIPS beamformer 1115 is used as the secondary or cascaded BIPS beamformer.

Each of the frontend beamformers 1111-1114 includes an array of phase shifters. Each of phase shifter includes a programable admittance or impedance and a crossover switch. For some embodiments in which the BIPS are series-connected, the phase shifters may be the phase shifters 341-344, with programmable admittances and crossover switches similar to 510 and 520 of FIG. 5. For some embodiments in which the BIPS are shunt-connected, the phase shifters may be the phase shifters 721-724, with programmable impedances and crossover switches similar to 731 and 741 of FIG. 7.

The crossovers switches in the frontend beamformers 1111-1114 are dual purposed to implement 180° phase shift, which allows the cascaded beamformer 1115 to be implemented without any crossover switch (shown as a blank dashed box). For example, if the crossover switches for the phase shifters in the frontend BIPS beamformers 1111-1114 are initially configured as [1, 1, 0, 0, . . . ], an extra 180° phase shift can be added to the output of the cascading BIPS beamforming circuit 1100 by reconfiguring those crossover switches to [0, 0, 1, 1, . . . ]. This eliminates the need for any crossover switches in the cascaded BIPS beamformer 1115 without affecting beamformer functionality.

Similarly, in some embodiments, for the combined BIPS and RF beamforming circuit described in Section III-B, a 180° (MSB) bit in the cascaded RF phase shifter can be eliminated by dual purposing the crossover switches in the front-end BIPS beamformer. Specifically, instead of using a full 0 to 360° phase shifter in the cascaded RF beamformer, a less lossy 0 to 180° phase shifter can be used, thereby eliminating circuit elements supporting the most significant bit (MSB) of the phase shifter. (The MSB is still used by the frontend BIPS beamforming circuits for configuring their programmable impedances/admittances/crossover switches.)

Figure 20:
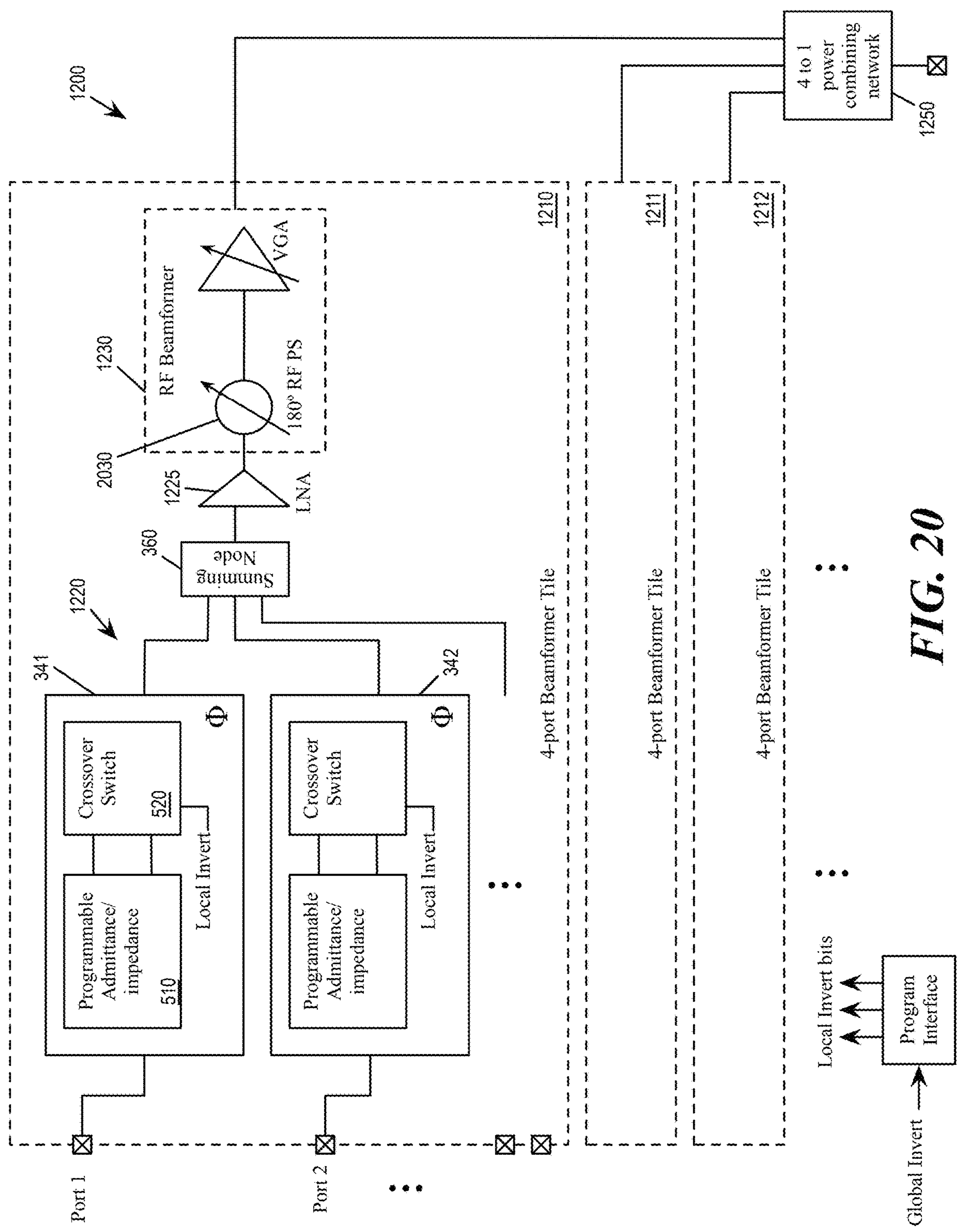
FIG. 20 illustrates the dual purposing of crossover switches in a combined BIPS and RF beamforming circuit.

FIG. 20 illustrates the dual purposing of crossover switches in a combined BIPS and RF beamforming circuit. The figure illustrates a portion of the combined BIPS and RF beamforming circuit 1200, for some embodiments in which the crossover switches in the frontend BIPS phase shifters are dual purposed to achieve 180° phase shift. The combined BIPS and RF beamforming circuit 1200 includes several (4-port) beamforming tiles 1210-1213. Each beamforming tile includes a frontend BIPS beamformer and a backend cascaded RF beamformer to support ports for 4 antenna elements. As illustrated, the beamforming tile 1210 includes the frontend BIPS beamformer 1220 and the cascaded RF beamformer 1230 to support ports 1-4.

Each frontend BIPS beamformers (e.g., 1220) includes an array of phase shifters. Each phase shifter includes a programable admittance or impedance and a crossover switch. For some embodiments in which the BIPS are series-connected, the phase shifters may be the phase shifters 341-344, with programmable admittances and crossover switches similar to 510 and 520 of FIG. 5. For some embodiments in which the BIPS are shunt-connected, the phase shifters may be the phase shifters 721-724, with programmable impedances and crossover switches similar to 731 and 741 of FIG. 7.

As illustrated, the crossover switches in the frontend beamformer 1220 are dual purposed to implement an additional 180° phase shift, which allows the cascaded RF beamformer 1230 of the tile 1210 to be implemented by a 180° RF phase shifter 2030 rather than a full 360° RF phase shifter, thereby eliminating the MSB. The additional 180° phase shift can be realized by inverting all crossover switches in the frontend BIPS beamformers. Thus, if the crossover switches in the front-end BIPS beamformer 1220 are initially configured as [1, 1, 0, 0, . . . ], an extra 180° phase shift can be added to the output of the combined BIPS and RF beamforming circuit 1200 by reconfiguring those crossover switches to [0, 0, 1, 1, . . . ]. This eliminates the need for MSB (or full) 360° in the RF phase shifters 2030 of the cascaded RF beamformers 1230 without affecting beamformer functionality.

In both the cascaded BIPS beamforming circuit scenario and the combined BIPS and RF beamforming circuit scenarios, lossy circuit components (e.g., crossover switches or MSB bit of the RF phase shifter) are eliminated by duel purposing the crossover switches in the frontend BIPS beamformer. This reduces passive losses in the circuits and improves RF performance and power consumption.

In some embodiments, the beamformer circuits described above may have a programmable interface and some working (or non-volatile) memory to facilitate the configuration of the beamformers and signal processing blocks (such as amplifier, transformer, mixer, digital converter, or other common circuit block.) In some embodiments, these beamformer circuits include VGAs and other circuits to implement amplitude control, e.g., signal amplitude modulation for notching and tapering. The beamformer circuits described above may be implemented on different technology nodes or PCB manufacturing techniques, i.e., silicon or other technology nodes, using transistors or any electrically controllable switches (e.g., Bulk, RFSOI, finFET, GAA, BICMOS, SiGe, GaAs, GaN, MEMS, etc.). This includes implementation that are not integrated or only partially integrated into an Application Specific Integrated Circuit (ASIC).

In some embodiments, the beamformers described above may have differential or single-ended ports. These ports may also be input or output or input/output ports. These ports may also be buffered or not. The ports may terminate into antennas or some other signal processing block. The beamformer may have N beamforming ports (N=number of inputs/outputs or antennas) and may accommodate multiple polarizations (e.g., vertical, horizontal, circular).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A beamforming system comprising:

a plurality of beamforming ports;

a summation port;

a first set of two or more of balanced-impedance phase shifter (BIPS) beamforming circuits interconnecting the plurality of beamforming ports with a plurality of intermediate nodes, wherein each BIPS beamforming circuit of the first set of two or more BIPS beamforming circuits combines or splits signals between two or more of the plurality of beamforming ports and one of the intermediate nodes; and a second set of one or more beamforming circuits interconnecting the plurality of intermediate nodes with the summation port to combine or split signals between the first set of two or more BIPS beamforming circuits and the summation port.

2. The beamforming system of claim 1, wherein the first set of two or more BIPS beamforming circuits receives a plurality of port signals from the plurality of beamforming ports to generate a plurality of intermediate signals at the plurality of intermediate nodes and the second set of one or more beamforming circuits receives the plurality of intermediate signals to generate a combined signal at the summation port.

3. The beamforming system of claim 1, wherein the second set of one or more beamforming circuits receives a source signal from the summation port to generate a plurality of intermediate signals and the first set of two or more BIPS beamforming circuits receives the plurality of intermediate signals at the plurality of intermediate nodes to generate a plurality of port signals at the plurality of beamforming ports.

4. The beamforming system of claim 1, wherein each of the two or more BIPS beamforming circuits comprises:

a plurality of phase shifters; and a summing node at which the plurality of phase shifters is connected in series, wherein each phase shifter comprises a programmable admittance controlling phase shifting.

5. The beamforming system of claim 1, wherein each of the two or more BIPS beamforming circuits comprises:

a plurality of phase shifters; and a summing node at which the plurality of phase shifters is connected in shunt, wherein each phase shifter comprises a programmable impedance controlling phase shifting, and wherein the summing node is connected to one of the plurality of intermediate nodes.

6. The beamforming system of claim 1, wherein the second set of one or more beamforming circuits comprises a BIPS beamforming circuit.

7. The beamforming system of claim 1, wherein the second set of one or more beamforming circuits does not comprise a BIPS beamforming circuit.

8. The beamforming system of claim 1, wherein the second set of one or more beamforming circuits comprises a plurality of radio frequency (RF) beamforming circuits, each RF beamforming circuit receiving an intermediate signal from a corresponding BIPS beamforming circuit to generate an output signal.

9. The beamforming system of claim 8, wherein each RF beamforming circuit in the second set of one or more beamforming circuits comprises an active amplifier.

10. The beamforming system of claim 8, wherein each RF beamforming circuit in the second set of one or more beamforming circuits utilizes local oscillator (LO), intermediate frequency (IF), or baseband (BB) beamforming techniques.

11. The beamforming system of claim 8, further comprising a power combiner circuit for combining amplified signals generated by the plurality of RF beamforming circuits to generate a combined signal at the summation port.

12. The beamforming system of claim 1, wherein the plurality of beamforming ports supports more than eight antenna elements.

13. The beamforming system of claim 1, wherein the first set of two or more BIPS beamforming circuits and the second set of one or more beamforming circuits are configured to perform phase shifting based on desired beamforming characteristics and array geometry, wherein phase shifters in the first set of two or more BIPS beamforming circuits are configured to perform a first stage of phase shifting and phase shifters in the second set of one or more beamforming circuits are configured to perform a second stage of phase shifting.

14. The beamforming system of claim 1, wherein each of the first set of two or more BIPS beamforming circuits comprises a plurality of phase shifters, each phase shifter comprising a programmable admittance or impedance for controlling phase shifting and a crossover switch for selectively introducing one of a 0° phase shift and a 180° phase shift.

15. The beamforming system of claim 14, wherein the second set of one or more beamforming circuits comprises a BIPS beamforming circuit having a plurality of phase shifters that does not comprise a crossover switch.

16. The beamforming system of claim 15, wherein the crossover switch in each phase shifter of the first set of two or more BIPS beamforming circuits is configured to introduce an additional 180° phase shift.

17. The beamforming system of claim 14, wherein the second set of one or more beamforming circuits comprises a plurality of radio frequency (RF) beamforming circuits, each RF beamforming circuit comprising a phase shifter that is limited to less than 360° of phase shifting.

18. The beamforming system of claim 14, wherein the second set of one or more beamforming circuits comprise a plurality of radio frequency (RF) beamforming circuits, each RF beamforming circuit comprising a phase shifter that is limited to 180° or less phase shifting.

* * * * *